US009604757B2

(12) United States Patent
Spivack et al.

(10) Patent No.: US 9,604,757 B2
(45) Date of Patent: Mar. 28, 2017

(54) REUSABLE BAG HOLDER AND SYSTEM AND METHOD OF USING THE SAME

(71) Applicant: My Smart Products, LLC, Greenwood Village, CO (US)

(72) Inventors: Lawrence Spivack, Greenwood Village, CO (US); Lisa Williams, Greenwood Village, CO (US)

(73) Assignee: My Smart Products, LLC, Greenwood Village, CO (US)

(*) Notice: Subject to any disclaimer, the term of this patent is extended or adjusted under 35 U.S.C. 154(b) by 102 days.

(21) Appl. No.: 14/635,916

(22) Filed: Mar. 2, 2015

(65) Prior Publication Data

US 2015/0246751 A1    Sep. 3, 2015

Related U.S. Application Data

(60) Provisional application No. 61/946,627, filed on Feb. 28, 2014.

(51) Int. Cl.
| | | |
|---|---|---|
| *B65D 30/22* | (2006.01) | |
| *B65D 33/10* | (2006.01) | |
| *B65D 30/20* | (2006.01) | |
| *B62B 3/14* | (2006.01) | |
| *A45C 3/04* | (2006.01) | |
| *A45C 7/00* | (2006.01) | |
| *A45C 13/02* | (2006.01) | |

(52) U.S. Cl.
CPC ............ *B65D 31/12* (2013.01); *A45C 3/04* (2013.01); *A45C 7/0086* (2013.01); *A45C 13/02* (2013.01); *B62B 3/1464* (2013.01); *B65D 31/10* (2013.01); *B65D 33/105* (2013.01); *Y02W 30/807* (2015.05)

(58) Field of Classification Search
None
See application file for complete search history.

(56) References Cited

U.S. PATENT DOCUMENTS

| | | |
|---|---|---|
| 2,473,429 A | 6/1949 | Hinman |
| 4,428,484 A | 1/1984 | Rattay et al. |
| 4,542,826 A | 9/1985 | Adams |

(Continued)

FOREIGN PATENT DOCUMENTS

| | | | |
|---|---|---|---|
| CH | 702253 | 5/2011 | |
| CN | DE 202012103782 U1 * | 11/2012 | ............ A45C 3/04 |

(Continued)

OTHER PUBLICATIONS

CleanWave Portable UV-C Sanitizing Wand, YouTube, Oct. 3, 2012, www.youtube.com/watch?v=A-VgVHQfXpw.*

(Continued)

*Primary Examiner* — Justin Larson
(74) *Attorney, Agent, or Firm* — Sheridan Ross P.C.

(57) ABSTRACT

A reusable shopping bag holder and system and method of using a reusable shopping bag holder and system is disclosed herein. The system includes a primary bag and a plurality of flexible secondary bags. The primary bag includes a plurality of compartments formed by dividers or pockets. The compartments store the secondary bags such that the secondary bags can be removed from the primary bag as necessary to store and carry shopping items. The primary bag itself may also be used to carry shopping items.

14 Claims, 9 Drawing Sheets

(56) References Cited

U.S. PATENT DOCUMENTS

| | | |
|---|---|---|
| 5,046,860 A | 9/1991 | Brennan |
| 5,182,895 A | 2/1993 | Lugo |
| 5,209,385 A | 5/1993 | Ledesma |
| 5,217,119 A * | 6/1993 | Hollingsworth ...... G06F 1/1628 190/102 |
| 5,377,833 A | 1/1995 | Ranger |
| 5,531,366 A | 7/1996 | Strom |
| 5,618,255 A | 4/1997 | Nickell et al. |
| 5,647,832 A | 7/1997 | Nickell et al. |
| 5,649,767 A | 7/1997 | Nickell et al. |
| 5,791,481 A | 8/1998 | Thomas |
| D397,871 S | 9/1998 | Bellehchili |
| 5,813,445 A | 9/1998 | Christman |
| 5,860,525 A | 1/1999 | Bellehchili |
| D414,932 S | 10/1999 | Platte, III |
| 6,152,202 A | 11/2000 | Magid |
| 6,240,709 B1 | 6/2001 | Cook |
| D453,874 S | 2/2002 | Frase |
| D457,317 S | 5/2002 | Steere |
| 6,854,747 B2 | 2/2005 | Erickson |
| 7,247,132 B2 | 7/2007 | Hugenholtz |
| D577,189 S | 9/2008 | Radke |
| D590,150 S | 4/2009 | Miller |
| D598,194 S | 8/2009 | Turvey et al. |
| D599,550 S | 9/2009 | Turvey et al. |
| 7,815,372 B2 | 10/2010 | Stanton et al. |
| 7,958,920 B1 | 6/2011 | Olsson |
| 7,992,879 B2 | 8/2011 | Eisenberg et al. |
| 8,011,500 B2 | 9/2011 | Lee |
| 8,016,111 B2 | 9/2011 | Wilson et al. |
| 8,177,431 B2 | 5/2012 | Turvey et al. |
| 8,254,022 B2 * | 8/2012 | McMurtry ............. G02B 21/26 359/391 |
| 8,281,950 B2 | 10/2012 | Potts et al. |
| 8,287,188 B2 | 10/2012 | Hoyord et al. |
| 9,241,550 B2 * | 1/2016 | James ..................... A45C 3/00 |
| 2008/0083629 A1 | 4/2008 | Soucie |
| 2009/0080808 A1 | 3/2009 | Hagen |
| 2009/0173646 A1 | 7/2009 | Blomberg |
| 2009/0268990 A1 | 10/2009 | Wilson et al. |
| 2009/0290816 A1 | 11/2009 | Nathan et al. |
| 2009/0304307 A1 | 12/2009 | Diep et al. |
| 2009/0314678 A1 | 12/2009 | Stein |
| 2009/0317021 A1 | 12/2009 | Taylor |
| 2010/0008604 A1 | 1/2010 | McIver |
| 2010/0084443 A1 | 4/2010 | Adelman |
| 2010/0104224 A1 * | 4/2010 | Hickey .................... A45C 3/04 383/12 |
| 2010/0158414 A1 | 6/2010 | Michailidis |
| 2010/0177986 A1 | 7/2010 | Kohn et al. |
| 2010/0200450 A1 | 8/2010 | Weed |
| 2010/0236953 A1 | 9/2010 | Myers et al. |
| 2010/0270342 A1 | 10/2010 | Barthel |
| 2010/0314428 A1 | 12/2010 | Dapkins, Jr. et al. |
| 2010/0320246 A1 | 12/2010 | Taylor |
| 2011/0168765 A1 | 7/2011 | Hoyord et al. |
| 2011/0174824 A1 | 7/2011 | Potts et al. |
| 2011/0176750 A1 | 7/2011 | Keller |
| 2011/0270696 A1 | 11/2011 | Vincent et al. |
| 2011/0293203 A1 | 12/2011 | Wilson et al. |
| 2012/0087601 A1 * | 4/2012 | Nathan .................... A45C 3/04 383/37 |
| 2013/0156351 A1 | 6/2013 | Kern et al. |
| 2015/0125096 A1 * | 5/2015 | Mulholland ........... B65D 31/02 383/38 |

FOREIGN PATENT DOCUMENTS

| | | | |
|---|---|---|---|
| DE | 102009056942 | 5/2012 | |
| EP | 1792549 | 6/2007 | |
| EP | 1666367 | 9/2007 | |
| GB | 1348319 | 3/1974 | |
| GB | 2448001 | 4/2009 | |
| GB | 2454288 | 9/2009 | |
| GB | 2458151 | 9/2009 | |
| IT | EP 1792549 A3 * | 8/2008 | ............... A45C 3/04 |
| WO | WO 95/04457 | 2/1995 | |
| WO | WO 2008/011463 | 1/2008 | |
| WO | WO 2009/108211 | 9/2009 | |
| WO | WO 2012/060989 | 5/2012 | |

OTHER PUBLICATIONS

"Collapsible Wine Bottle Party Tote—Green," HomeWetBar.com, © 2004-2013, 4 pages [retrieved from: http://www.homewetbar.com/Collapsible-Party-Wine-Bottle-Tote-Green-p-870.html].

Firstenfeld, "Shipping out in style." ProQue4st Dialog, 2004, 6 pages [retrieved from: http://search.proquest.com/professional/docview/1046412658?accountid=157282].

* cited by examiner

REUSABLE BAG HOLDER AND SYSTEM AND METHOD OF USING THE SAME

CROSS REFERENCE TO RELATED APPLICATIONS

This application claims priority from U.S. Provisional Patent Application Ser. No. 61/946,627, filed Feb. 28, 2014, entitled "Reusable Bag Holder and System," the entire disclosure of which is hereby expressly incorporated by reference in its entirety.

FIELD OF THE INVENTION

Embodiments of the present invention generally relate to a reusable bag with compartments, and more specifically to a reusable bag holder and system.

SUMMARY OF THE INVENTION

Consumers often bring home merchandise in disposable paper or plastic shopping bags because they do not bring their own reusable bags to the store. The manufacture and disposal of these paper and plastic disposable bags places a burden on the environment because timber, petroleum, and energy must be used the make the disposable bags, landfills must be used to dispose of the bags, and pollution is created in both the manufacturing and disposal processes. The public has become increasingly more aware of the environmental problems associated with disposable bags. That is why some cities have banned certain disposable bags and some cites and countries require that stores charge consumers for each disposable bag they receive from a store.

Although reusable bags have been developed and improved over the years, they are still somewhat slow to catch on. There are many reasons why consumers do not use reusable shopping bags. One reason is consumers find it difficult to bring more than one reusable bag to the store because holding multiple bags is awkward and cumbersome. Furthermore, storing more than one reusable shopping bag in a consumer's car, bike, moped, etc. is also awkward and difficult. The two or more shopping bags may slide around the trunk of the consumer's car, may take up precious space in the back of a minivan or SUV, and may not fit in the consumer's bike basket. Additionally, reusable bags are not designed to store other reusable bags and purchased items. Most reusable shopping bags have only one main compartment and no pockets or separators to organize purchased items.

Accordingly, there exists a significant need for a reusable shopping bag system that will hold multiple reusable bags and purchased items. These and other needs are addressed by the various embodiments and configurations of the present invention. Thus, this invention relates to a novel system, device, and method for providing a bag with compartments to hold reusable shopping bags. The novel bag holder and system provided herein allow a user to neatly contain reusable shopping bags.

The novelty of the present invention relates to: (1) a device and system comprising a bag with compartments, which neatly and cleanly contain reusable shopping bags within the bag; (2) a device and system for containing reusable shopping bags within a user's car, bike, and/or shopping cart; and (3) a method of using the bag with compartments to contain reusable shopping bags.

Thus, it is one aspect of various embodiments of the present invention to provide a reusable shopping bag system that holds multiple reusable bags and that may be used to hold purchased items. Accordingly, the system can be used to hold reusable bags and to hold various types of purchased items, e.g., frozen food, produce, bread, canned goods, beverages, paper goods, cleaning supplies, shoes, clothing, etc. In one embodiment, the reusable shopping bag system comprises a main bag and one or more secondary bags. The secondary bags may include a reusable bag, a reusable freezer bag, and a reusable produce bag.

It is another aspect of embodiments of the present invention to provide a shopping bag system that neatly contains and stores multiple reusable bags within the user's car, shopping cart, bike basket, trunk, etc. Therefore, bags are not floating around a consumer's trunk or back seat. The bags are contained within a bag holder or another reusable bag and the system is readily folded and stored in a relatively small space. One advantage of some embodiments is that the shopping bag system neatly contains multiple reusable bags within the user's car, shopping cart, bike basket, trunk, etc. Some embodiments further include interconnection features for securing the system to the inside of the user's car, trunk, and/or shopping cart.

It is one aspect of embodiments of the present invention to quickly and easily store and remove reusable bags. Thus, various embodiments of the present invention allow a user to quickly insert and remove reusable bags into a main bag or other reusable bag holder.

It is another aspect of various embodiments to provide a reusable shopping bag storage system comprising a main bag and secondary bags made of a renewable material. Such materials may include bamboo, cotton, paper, rayon, and the like.

It is an aspect of some embodiments of the present invention to provide a reusable shopping bag holder and system that is reusable and withstands wear and tear such that the reusable shopping bag holder and system can be used over and over again. Thus, in one embodiment, the reusable shopping bag holder and/or one or more of the reusable shopping bags can be made out of non-woven laminate, non-woven polypropylene, or woven nylon.

It is one aspect of various embodiments to provide a reusable shopping bag storage system that comprises a main bag with pockets and compartments and one or more secondary bags. The pockets may be internal or external pockets. In some embodiments, the pockets hold bags (reusable or disposable). In additional or alternative embodiments, the pockets can hold keys, phones, tablets, wallets, billfolds, coupons, etc.

One aspect of embodiments of the present invention is to provide a reusable shopping bag storage system that allows for cleaning and/or sanitizing the reusable bags after each use. Another aspect is to provide a reusable shopping bag storage system that prevents, or at least hinders, build up of germs, microorganism, dirt, stains, grime, etc. Further, a reusable shopping bag system where any portion or all of the bag system may be machine washed if it should become soiled is provided.

It is one aspect of embodiments to provide a reusable shopping bag storage system that also reminds a user to remove the system from the user's car or other vehicle before entering a store. Thus, in one embodiment, the primary bag may include a chip or other processor that communicates with the user's phone, tablet, smart watch, vehicle infotainment system (e.g., car's audio an navigation system), etc. to remind the user to take the reusable shopping bag storage system into the store.

Another aspect of embodiments of the present invention is a method for manufacturing a reusable shopping bag storage and holder system. More specifically, a method for forming a main bag and secondary bags is provided.

In one embodiment of the present invention, a reusable shopping bag system comprises: a main bag having: material forming a compartment with an open end, a closed end, an interior surface, and an exterior surface; a front; a back opposite the front; two sides positioned between the front and back; a pair of carrying handles interconnected to the compartment at the open end; a plurality of dividers forming a plurality of storage compartments for storing one or more secondary bags, wherein at least one divider is interconnected to the interior surface of the compartment; and a plurality of secondary bags, wherein each secondary bag in the plurality of secondary bags is stored in one storage compartment in the plurality of storage compartments, and wherein each of the secondary bags can be removed and filled with shopping items.

In one embodiment, a reusable shopping bag system is provided. The reusable shopping bag system comprises: a main bag having: a flexible base; a flexible sidewall forming a perimeter with a first end, a second end, an interior surface, and an exterior surface, wherein the base is secured to the sidewall at the first end of the perimeter and the second end of the perimeter is open forming an opening; a pair of carrying handles interconnected to the sidewall at the second end; a plurality of dividers forming a plurality of storage compartments for storing one or more secondary bags, the plurality of dividers interconnected to the sidewall of the main bag; and a plurality of secondary bags, wherein each secondary bag in the plurality of secondary bags is stored in one of the storage compartments in the plurality of storage compartments, and wherein each secondary bag in the plurality of secondary bags can be removed from its corresponding storage compartment in the plurality of storage compartments and filled with shopping items.

In one embodiment, a reusable shopping bag is provided. The reusable shopping bag comprises: a front panel having an outer surface, an inner surface, a first side edge, a second side edge, a bottom edge, and a top edge, the front panel being comprised of a non-woven material; a back panel positioned opposite the front panel and having an outer surface, an inner surface, a first side edge, a second side edge, a bottom edge, and a top edge, the back panel being comprised of a non-woven material; a first side panel having an outer surface, an inner surface, a first side edge, a second side edge, a bottom edge, and a top edge, the first side panel being comprised of a non-woven material, where the first side edge of the first side panel is interconnected to the second side edge of the back panel and the second side edge of the first side panel is interconnected to the first side edge of the front panel; a second side panel having an outer surface, an inner surface, a first side edge, a second side edge, a bottom edge, and a top edge, the second side panel being comprised of a non-woven material, where the first side edge of the second side panel is interconnected to the second side edge of the front panel and the second side edge of the second side panel is interconnected to the first side edge of the back panel; a bottom panel having an outer surface, an inner surface, a first edge interconnected to the bottom edge of the front panel, a second edge interconnected to the bottom edge of the first side panel, a third edge interconnected to the bottom edge of the back panel, and a fourth edge interconnected to the bottom edge of the second side panel, the bottom panel being comprised of a non-woven material; a cavity formed by the bottom panel, front panel, back panel, first side panel, and second side panel, the cavity having an open end proximate the top edges of the front panel, back panel, first side panel, and second side panel; a first channel wall having a first edge interconnected to the inner surface of the first side panel and a second edge interconnected to the inner surface of the second side panel, where the first channel wall is substantially perpendicular to the first side panel; a second channel wall having a first edge interconnected to the inner surface of the first side panel and a second edge interconnected to the inner surface of the second side panel, where the second channel wall is substantially parallel to the first channel wall, and where the first channel wall and the second channel wall form a channel in the cavity; a first divider having a first edge interconnected to the inner surface of the front panel and a second edge interconnected to the first channel wall, where the first divider, a portion of the first channel wall, a portion of the first side panel, and a portion of the front panel form a first compartment; and a second divider having a first edge interconnected to the inner surface of the back panel and a second edge interconnected to the second channel wall, where the second divider, a portion of the second channel wall, a portion of the first side panel, and a portion of the back panel form a second compartment.

In some embodiments, the reusable bag further comprises a first handle having a first end interconnected to a first portion of the front panel proximate the top edge and a second end interconnected to a second portion of the front panel proximate the top edge; and a second handle having a first end interconnected to a first portion of the back panel proximate the top edge and a second end interconnected to a second portion of the back panel proximate the top edge. In one embodiment, an interconnection device on at least one of the first handle and the second handle, and the interconnection device comprises a strap with male snap element that selectively engages a female snap element. In additional embodiments, the front panel, the back panel, the first side panel, and the second side panel are comprised of non-woven laminate material between about 95 gsm and about 175 gsm. In various embodiments, the reusable bag further comprises an ultraviolet wand interconnected to at least one of the front panel and the back panel. In a additional embodiment, the reusable bag further comprises at least one external pocket; piping positioned along a first corner formed by the front panel and the first side panel; piping positioned along a second corner formed by the first side panel and the back panel; piping positioned along a third corner formed by the back panel and the second side panel; and piping positioned along a fourth corner formed by the front panel and the second side panel. In one embodiment, the reusable bag further includes a closure mechanism comprising: a first strap having a proximal end interconnected to the first channel wall proximate to a center of an upper edge of the first channel wall and a distal end opposite the proximal end, where the distal end includes a fastener; and a second strap having a proximal end interconnected to the second channel wall proximate to a center of an upper edge of the second channel wall and a distal end opposite the proximal end, where the distal end includes a fastener adapted to mateably receive the fastener of the first strap. Additionally, the fastener of the first strap is one of a hook material, a loop material, a female snap, and a male snap, and where the second strap is one of a hook material, a loop material, a female snap, and a male snap.

In one embodiment, a reusable shopping bag system is provided comprising: a primary bag having: a front panel having an outer surface, an inner surface, a first side edge, a second side edge, a bottom edge, and a top edge, the front panel being comprised of a non-woven material; a back panel positioned opposite the front panel and having an outer surface, an inner surface, a first side edge, a second side edge, a bottom edge, and a top edge, the back panel being comprised of a non-woven material; a first side panel having an outer surface, an inner surface, a first side edge, a second side edge, a bottom edge, and a top edge, the first side panel being comprised of a non-woven material, where the first side edge of the first side panel is interconnected to the second side edge of the back panel and the second side edge of the first side panel is interconnected to the first side edge of the front panel; a second side panel having an outer surface, an inner surface, a first side edge, a second side edge, a bottom edge, and a top edge, the second side panel being comprised of a non-woven material, where the first side edge of the second side panel is interconnected to the second side edge of the front panel and the second side edge of the second side panel is interconnected to the first side edge of the back panel; a bottom panel having an outer surface, an inner surface, a first edge interconnected to the bottom edge of the front panel, a second edge interconnected to the bottom edge of the first side panel, a third edge interconnected to the bottom edge of the back panel, and a fourth edge interconnected to the bottom edge of the second side panel, the bottom panel being comprised of a non-woven material; a cavity formed by the bottom panel, front panel, back panel, first side panel, and second side panel, the cavity having an open end proximate the top edges of the front panel, back panel, first side panel, and second side panel; a plurality of dividers forming a plurality of storage compartments, where each divider in the plurality of dividers has at least one edge interconnected to the inner surface of at least one of the front panel, the back panel, the first side panel, and the second side panel; a first handle having a first end interconnected to a first portion of the front panel proximate the top edge and a second end interconnected to a second portion of the front panel proximate the top edge; a second handle having a first end interconnected to a first portion of the back panel proximate the top edge and a second end interconnected to a second portion of the back panel proximate the top edge; and a pocket; and a plurality of secondary bags comprising: a plurality of reusable shopping bags, where each reusable shopping bag includes a front, a back opposite the front, a first side and a second side positioned between the front and the back, and a bottom forming a compartment with an open end and a closed end proximate the bottom; a first carrying handle interconnected to the front proximate the open end; and a second carrying handle interconnected to the back proximate the open end, where each reusable shopping bag in the plurality of reusable shopping bags is stored in each compartment of the plurality of storage compartments in the primary bag; an insulated reusable bag including a front, a back opposite the front, a first side and a second side positioned between the front and back, and a bottom forming a compartment with an open end and a closed end proximate the bottom; an insulating material positioned on an inner surface of the front and an inner surface of the back; a first carrying handle interconnected on a first end to an outer surface of the front proximate the closed end and extending from the closed end to the open end and interconnected on a second end to an outer surface of the front and extending from the closed end to the open end; and a second carrying handle interconnected on a first end to an outer surface of the back proximate the closed end and extending from the closed end to the open end and interconnected on a second end to an outer surface of the back and extending from the closed end to the open end; and a reusable mesh bag comprising an open end, a closed end, and a closure mechanism proximate the open end for closing the open end, where at least one of the insulated reusable bag and the reusable mesh bag is stored in the pocket of the primary bag.

In additional embodiments, the primary bag further comprises: a first channel wall having a first edge interconnected to an inner surface of the first side panel and a second edge interconnected to an inner surface of the second side panel, where the first channel wall is substantially perpendicular to the first side panel; and a second channel wall having a first edge interconnected to the inner surface of the first side panel and a second edge interconnected to the inner surface of the second side panel, where the second channel wall is substantially parallel to the first channel wall, and where the first channel wall and the second channel wall form a channel in the cavity. In one embodiment, the primary bag further comprises: a first divider in the plurality of dividers having a first edge interconnected to the inner surface of the front panel and a second edge interconnected to the first channel wall, where the first divider in the plurality of dividers, a portion of the first channel wall, a portion of the first side panel, and a portion of the front panel form a first compartment in the plurality of compartments; and a second divider in the plurality of dividers having a first edge interconnected to the inner surface of the back panel and a second edge interconnected to the second channel wall, where the second divider in the plurality of dividers, a portion of the second channel wall, a portion of the first side panel, and a portion of the back panel form a second compartment in the plurality of compartments. In some embodiments, a first reusable shopping bag in the plurality of reusable shopping bags comprises a closure mechanism comprising: a first strap having a proximal end interconnected to the front proximate to the open end and a distal end opposite the proximal end, where the distal end includes a fastener; and a second strap having a proximal end interconnected to the back proximate to the open end and a distal end opposite the proximal end, where the distal end includes a fastener adapted to mateably receive the fastener of the first strap. In further embodiments, the front panel, the back panel, the first side panel, and the second side panel of the primary bag are comprised of non-woven laminate material between about 95 gsm and about 175 gsm; the front, the back, the first side, and the second side of each reusable shopping bag in the plurality of reusable shopping bags are comprised of non-woven laminate material between about 95 gsm and about 145 gsm; the front, the back, the first side, and the second side of the insulated reusable bag are comprised of non-woven polypropylene material between about 60 gsm and about 105 gsm; and the insulating material is spunlace foil insulation. In on embodiment, the primary bag further comprises an interconnection device on at least one of the first handle and the second handle, where the interconnection device detachably secures the reusable shopping bag system to at least one of a shopping cart, an interior of a vehicle, and a trunk.

One embodiment of the present invention includes a method of removing a first secondary bag from a main bag; unrolling the first secondary bag; opening the first secondary bag; filling the first secondary bag with one or more items; removing a second secondary bag from the main bag; unrolling the second secondary bag; opening the second secondary bag; and filling the second secondary bag with one or more items.

In one embodiment, a method of using a reusable shopping bag system is provided, the method comprising: providing a primary bag with a plurality of compartments and a pocket; providing a plurality of secondary bags; storing each secondary bag in the plurality of secondary bags in at least one of the pocket of the primary bag and a compartment in the plurality of compartments in the primary bag; removing a first secondary bag in the plurality of secondary bags from the primary bag; opening the first secondary bag; filling the first secondary bag with one or more items; removing a second secondary bag in the plurality of secondary bags from the primary bag; opening the second secondary bag; filling the second secondary bag with one or more items; removing the one or more items from the first secondary bag; rolling or folding the first secondary bag; placing the first secondary bag in at least one of the pocket of the primary bag and a compartment in the plurality of compartments in the primary bag; removing the one or more items from the second secondary bag; rolling or folding the second secondary bag; and placing the second secondary bag in at least one of the pocket of the primary bag and a compartment in the plurality of compartments in the primary bag.

In further embodiments, the plurality of secondary bags comprises: a plurality of reusable shopping bags, where each reusable shopping bag includes a front, a back opposite the front, a first side and a second side positioned between the front and the back, and a bottom forming a compartment with an open end and a closed end proximate the bottom; a first carrying handle interconnected to the front proximate the open end; and a second carrying handle interconnected to the back proximate the open end; an insulated reusable bag including a front, a back opposite the front, a first side and a second side positioned between the front and back, and a bottom forming a compartment with an open end and a closed end proximate the bottom; an insulating material positioned on an inner surface of the front and an inner surface of the back; a first carrying handle interconnected on a first end to an outer surface of the front proximate the closed end and extending from the closed end to the open end and interconnected on a second end to an outer surface of the front and extending from the closed end to the open end; and a second carrying handle interconnected on a first end to an outer surface of the back proximate the closed end and extending from the closed end to the open end and interconnected on a second end to an outer surface of the back and extending from the closed end to the open end; and a reusable mesh bag comprising an open end, a closed end, and a closure mechanism proximate the open end for closing the open end. In some embodiments, the primary bag is comprised of non-woven laminate material between about 95 gsm and about 175 gsm, where each reusable shopping bag in the plurality of reusable shopping bags is comprised of non-woven laminate material between about 95 gsm and about 145 gsm, where the insulated reusable bag is comprised of non-woven polypropylene material between about 60 gsm and about 105 gsm, and where the insulating material is spunlace foil insulation. In additional or alternative embodiments, the primary bag also comprises a channel, where the plurality of secondary bags comprises an insulated reusable bag, and where the method further includes storing the insulated reusable bag in the channel of the primary bag. In some embodiments, the primary bag further comprises a first handle, a second handle, and an interconnection device on the first handle, where the method further comprises securing the reusable shopping bag system to a shopping cart via the interconnection device.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of the invention.

Figure 1:
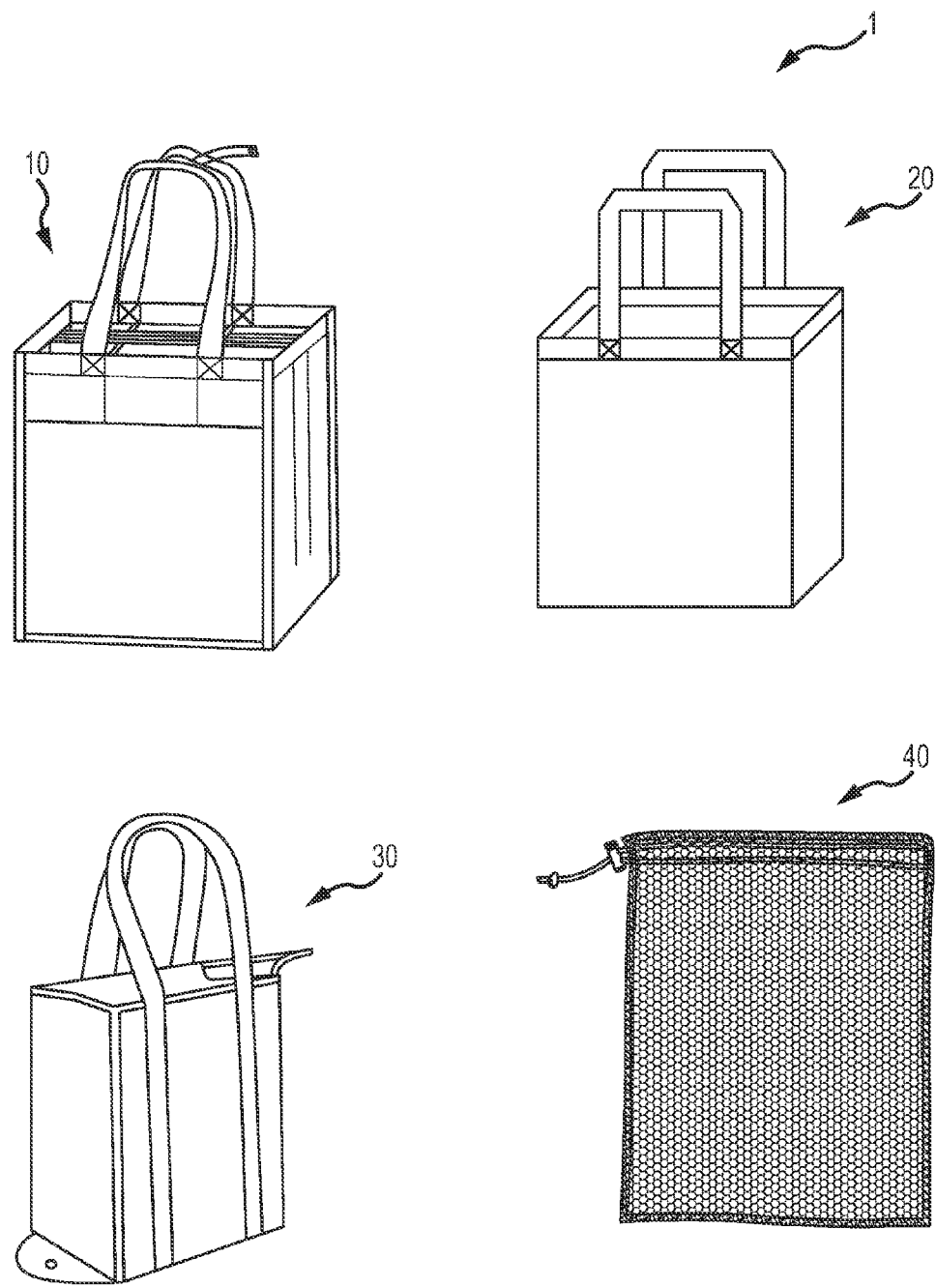
FIG. 1 shows one embodiment of the reusable shopping bag system.

To assist in the understanding of the embodiments of the present invention, the following list of components and associated numbering found in the drawings is provided herein:

| No. | Component |
|---|---|
| 1 | Reusable Bag System |
| 2 | Side Panel |
| 4 | Bottom Panel |
| 6 | Front Panel |
| 8 | Pocket |
| 10 | Main Bag |
| 12 | Handle |
| 14 | Compartment |
| 16 | Back Panel |
| 18 | Stiffening Hem |
| 20 | Second Bag |
| 22 | Side of Secondary/Reusable Bag |
| 26 | Front of Secondary/Reusable Bag |
| 28 | Cavity of Secondary/Reusable Bag |
| 30 | Freezer Bag |
| 32 | Front of Freezer Bag |
| 34 | Bottom of Freezer Bag |
| 36 | Side of Freezer Bag |
| 38 | Cavity of Freezer Bag |
| 40 | Produce Bag |
| 42 | Top of Produce Bag |
| 44 | Bottom of Produce Bag |
| 46 | First Side of Produce Bag |
| 48 | Second Side of Produce Bag |
| 50 | Divider Stitching |
| 52 | Divider Stitching |
| 54 | Cross Stitching |
| 56 | Cross Stitching |
| 58 | Channel |
| 60 | Side Piping |
| 62 | Bottom Piping |
| 64 | Interconnection Device |
| 66 | First Part of Closure Mechanism |
| 68 | Second Part of Closure Mechanism |
| 70 | Top Fold Stitching Line |
| 90 | Cart |
| 100 | Method of Use |
| 102 | Get Reusable Shopping Bag System |
| 106 | Secure System to Cart and Shop |
| 110 | Unpack Inner Bags |
| 114 | Check Out and Fill Bags |
| 118 | Empty Bags, Fold or Roll up Inner Bags |
| 122 | Put Inner Bags in Main Bag and Store |

-continued

| No. | Component |
|---|---|
| 130 | Divider |
| 132 | Channel Wall |
| 212 | Handle of Secondary/Reusable Bag |
| 254 | Cross Stitching of Secondary/Reusable Bag |
| 266 | Closure Mechanism of Secondary/Reusable Bag |
| 268 | Closure Mechanism of Secondary/Reusable Bag |
| 270 | Top Fold Stitching Line (Secondary/Reusable Bag) |
| 300 | Strap |
| 302 | Snap—Male |
| 304 | Snap—Female |
| 306 | Fold Line |
| 308 | Stitching |
| 312 | Handles Freezer Bag |
| 320 | Flap |
| 322 | Closure Mechanism |
| 360 | Side Piping Freezer Bag |
| 362 | Top Piping Freezer Bag |
| 366 | Closure Mechanism of Freezer Bag |
| 402 | Closure Mechanism |
| 404 | Draw String |
| 406 | Channel |
| L1 | Length of Main Bag |
| H1 | Height of Main Bag |
| W1 | Width of Main Bag |
| P1 | Height of Pocket |
| S1 | Fold Line Distance from End of Strap |
| C1 | Compartment Length |
| C2 | Compartment Width |
| L2 | Length of Secondary/Reusable Bag |
| W2 | Width of Secondary/Reusable Bag |
| H2 | Height of Secondary/Reusable Bag |
| S2 | Length of Strap Portion |
| L3 | Length of Freezer Bag |
| W3 | Width of Freezer Bag |
| H3 | Height of Freezer Bag |
| S3 | Length of Strap Folded Portion |
| S4 | Distance from End of Strap |
| L5 | Length of Strap |
| W5 | Strap Width |
| W6 | Channel Width |

DETAILED DESCRIPTION

Aspects and alternative embodiments in accordance with the present invention are disclosed in FIGS. 1-10. The attached drawings disclose a reusable shopping bag system 1 comprising a primary bag 10 with compartments for holding reusable shopping bags 20, 30, 40. Note that the reusable shopping bag system 1 may be called a shopping bag system, a reusable shopping bag storage system, a shopping bag storage system, a shopping bag holder system, a reusable bag holder system, a reusable grocery bag system, a reusable grocery bag holder system, and the like, herein. Additionally, the primary bag 10 may be called the main bag, main holder bag, holder, holder bag, or bag holder herein.

FIG. 1 shows one embodiment of the reusable shopping bag system 1. In the embodiment shown, the reusable shopping bag system 1 comprises a primary bag 10 and one or more secondary bags 20, 30, 40. The secondary bags (also called auxiliary bags herein) include at least one reusable bag 20, at least one freezer bag 30, and at least one produce bag 40. Note that the reusable bag 20 may be called a reusable grocery bag or a reusable shopping bag herein. The system 1 can include any number of reusable bags 20, freezer bags 30, and/or produce bags 40. The freezer bag 30 may also be called an insulated bag herein. The produce bag 40 may also be called a mesh bag herein.

The secondary bags 20, 30, 40 are stored within the primary bag 10. For example, the freezer bag 30 may be folded and stored in a pocket or channel in the main bag 10. The reusable bag 20 may be rolled or folded and stored in the main bag 10. Further, the produce bag 40 can be folded and stored in a pocket or compartment of the primary bag 10.

The secondary bags 20, 30, 40 can be similar in size, shape, and/or construction to the main bag 10. In some embodiments, the primary bag 10 and one or more secondary bags 20, 30, 40 can be made of the same material, with the same thickness, density (e.g., gsm or grams per square meter), etc. In other embodiments, the primary bag 10 can be a different material, thickness, density, etc. than the secondary bags 20, 30, 40. In various embodiments, the main bag 10 is 150 gsm, the reusable bags 20 are 120 gsm, and the insulated bag 30 is 80 gsm. In a further embodiment, the main bag 10 is a non-woven laminate material, the reusable bags 20 are a non-woven laminate material, and the insulated bag 30 is a non-woven polypropylene material. In another embodiment, the main bag 10 is 100 gsm while the reusable bags 20 and insulated bag 30 are 80 gsm. In other embodiments, the primary bag 10, the reusable bags 20, and the insulated bag 30 are either 150 gsm, 120 gsm, or 80 gsm. In some embodiments, the bags 10, 20, 30 are 80 gsm to 120 gsm non-woven polypropylene.

Figure 2:
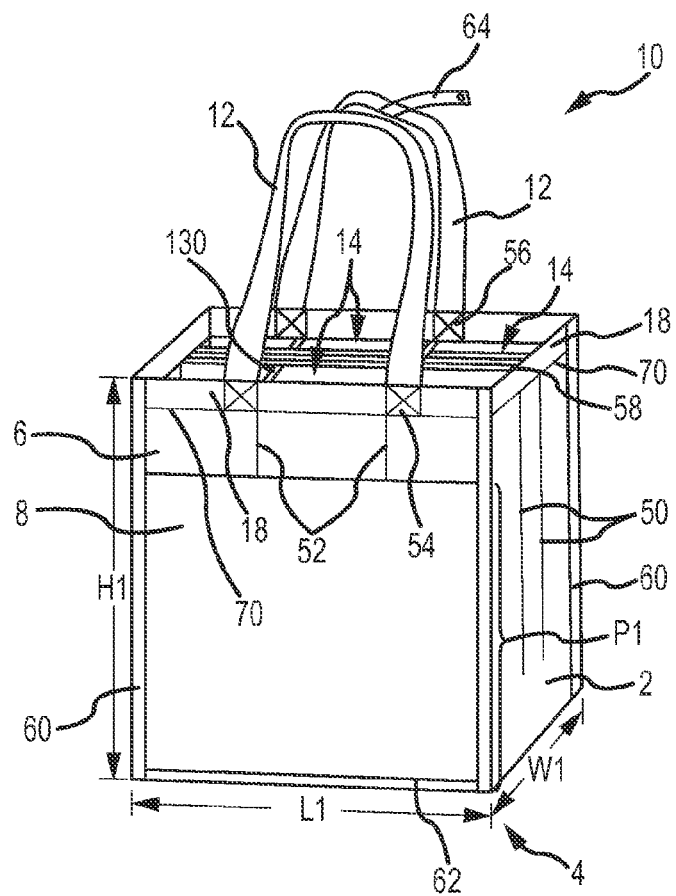
FIG. 2 shows a front perspective view of the main holder bag according to one embodiment.

FIG. 2 shows a front perspective view of the main holder bag 10 according to one embodiment. The primary bag 10 can be a reusable bag that is a part of a reusable shopping bag system. The primary bag 10 may have a front panel 6 (also called a front portion herein) opposite a back panel 16 (also called a back portion herein), two side panel 2 (also called side portion herein) between the front panel 6 and back panel 16, and a bottom panel 4 (also called a bottom portion herein). The front panel 6, two side panel 2, back panel 16, and bottom panel 4 each have an inner surface and an outer surface. The primary bag 10 may also have vertical corners between the front 6, back 16, and side 2 panels and horizontal corners between the bottom panel 4 and the front 6, back 16, and side 2 panels. The horizontal corners are positioned around a bottom end (also called a first end or a closed end herein) between the bottom 4 and the sidewalls (e.g., the sides 2, front 6, and back 16). The primary bag 10 also has a top end (also called a second end or an open end herein) with top edges. Additionally, the front panel 6, two side panels 2, back panel 16, and bottom panel 4 are interconnected such that their inner surfaces form an interior cavity with an open end proximate the top end and top edges and a closed end proximate to the bottom panel 4.

In some embodiments, the primary bag 10 has four generally rectangular sidewall panels 6, 2, 16 forming a perimeter wall that extends along a central axis. A rectangular end panel or bottom panel 4 is interconnected to the perimeter at one end and the opposite end is left open to form an opening into a cavity. The perimeter wall may be formed from a rectangular piece of fabric that is folded at the vertical corners and closed upon itself to allow opposite ends to be sewn or interconnected together along an axially extending seam to form a rectangular cross-sectioned perimeter.

In some embodiments, a top edge of one or more panels 6, 2, 16 is folded down and inward along a circumferentially extending fold line, substantially parallel to the horizontal corners, and sewn at the top fold stitching line 70 to the respective panel 6, 2, 16 to create a strengthening and stiffening hem 18 with a height. In one embodiment, the front panel 6 and the back panel 16 each have a stiffening hem 18 proximate to the open end and that is glued or sewn at the top fold stitching line 70. In additional or alternative embodiments, the upper edges of the side panels 2 also have a folded section that is sewn or glued at the top fold stitching line 70 to create a strengthening and stiffening hem 18 with a height. In one embodiment, the height of the stiffening hem 18 is between about 2.5 inches and about 0.5 inches. In a preferred embodiment, the height of the stiffening hem 18 is between about 1.5 inches and about 0.75 inches. In a more preferred embodiment, the height of the stiffening hem 18 is about 1 inch.

For support and to add structure, the primary bag 10 may have wires, dowels, rods, tubes, bars, strengthening and stiffening hems, tubing, piping, or other stiffening mechanisms or support elements to keep the bag 10 standing upright and/or open. In the embodiment shown, the primary bag 10 has side piping 60 along one or more vertical corners of the bag 10 and bottom piping 62 along one or more horizontal corners of the bag 10. In one embodiment, the piping is a woven nylon material for strength and to reduce fraying. In other embodiments, the piping can be another material, such as another woven material, a non-woven material, or any other material known in the art. Piping or other support elements may also be positioned in the upper edges of the bag 10. The support elements or piping 60, 62 may be glued or sewn into the main bag 10 or they may be slid into channels via openings in the corners. In some embodiments, the support elements are removable. Having the support elements in the vertical and/or horizontal corners allows the bag 10 to fold flat but also stand upright when need be.

The primary bag 10 has a height H1, a length L1, and a width W1. In one embodiment, the height H1 of the primary bag 10 is between about 10 inches and about 18 inches. In a preferred embodiment, the height H1 of the primary bag 10 is between about 12 inches and about 16 inches. In a more preferred embodiment, the height H1 of the primary bag 10 is between about 13 inches and about 15 inches. In a most preferred embodiment, the height H1 of the primary bag 10 is about 14 inches. In one embodiment, the length L1 of the primary bag 10 is between about 6 inches and about 12 inches. In a preferred embodiment, the length L1 of the primary bag 10 is between about 8 inches and about 10 inches. In a more preferred embodiment, the length L1 of the primary bag 10 is about 9 inches. In one embodiment, the width W1 of the primary bag 10 is between about 5 inches and about 9 inches. In a preferred embodiment, the width W1 of the primary bag 10 is between about 6 inches and about 8 inches. In a more preferred embodiment, the width W1 of the primary bag 10 is about 7 inches.

In a second embodiment, which may have four compartments 14 and a channel 58, the height H1 of the primary bag 10 is between about 10 inches and about 18 inches. In a preferred embodiment, the height H1 of the primary bag 10 is between about 12 inches and about 16 inches. In a more preferred embodiment, the height H1 of the primary bag 10 is between about 13 inches and about 15 inches. In a most preferred embodiment, the height H1 of the primary bag 10 is about 14 inches. In one embodiment, the length L1 of the primary bag 10 is between about 5 inches and about 9 inches. In a preferred embodiment, the length L1 of the primary bag 10 is between about 6 inches and about 8 inches. In a more preferred embodiment, the length L1 of the primary bag 10 is about 7 inches. In one embodiment, the width W1 of the primary bag 10 is between about 4 inches and about 8 inches. In a preferred embodiment, the width W1 of the primary bag 10 is between about 5 inches and about 7 inches. In a more preferred embodiment, the width W1 of the primary bag 10 is about 6 inches.

The primary bag 10 can have a pocket 8 to hold a user's wallet, phone, billfold, coupons, keys, sunglasses, shopping list, etc. The pocket 8 may be on the front 6, back 16, or a side 2 of the primary bag 10. Further, the pocket 8 may be on an outer surface of the bag 10 or on the inside of the bag 10, for example on an inner surface of a panel 2, 6, 16 or on a surface of a channel wall. Additionally, the bag may have two or more pockets 8 for holding a user's personal items or small shopping items (e.g., gum, candy, greeting cards). Thus, one pocket 8 can be on a front panel 6 of the bag 10 and a second pocket (not shown) can be on a back panel 16 of the bag 10. In one embodiment, the pocket 8 is interconnected to the outer surface of the front portion 6. The pocket 8 can extend along the front panel of the main bag 10 from the closed end at the bottom 4 to the opposite open end. In other embodiments, the pocket 8 does not extend all the way to the open end of the primary bag 10. Thus, the pocket 8 may not extend up the entire height H1 of the primary bag 10. Therefore, in one embodiment, the pocket height P1 is between about 8 inches and about 14 inches. In a preferred embodiment, the pocket height P1 of the primary bag 10 is between about 10 inches and about 12 inches. In a more preferred embodiment, the pocket height P1 of the primary bag 10 is about 11 inches. In some embodiments, the pocket 8 extends from the lower end of the front portion 6 up a pocket height P1. The pocket 8 is interconnected to the primary bag 10 on three sides of the pocket 8. The pocket 8 may be the same material as the primary bag 10 or the pocket 8 can be a different material. Additionally, the pocket 8 may be the same color as the primary bag 10 or the pocket 8 can be a different color and even have a different design or pattern than the other outer surfaces of the primary bag 10. The pocket 8 may be large enough to store at least one secondary bag 20, 30, 40, and specifically may be large enough to store a reusable produce bag 40.

In some embodiments, the main bag 10 also has one or more handles 12, one or more pockets 8, and/or interconnection devices, such as zippers, Velcro, tabs, or clips. In the embodiment shown, the primary bag 10 includes a pair of carrying handles 12. Each handle 12 has a first end and a second end. The first end of the first handle 12 and the second end of the first handle 12 can be interconnected to the upper end or edge of the front panel 6 proximate the open end. In some embodiments, the first and second ends of the first handle 12 are interconnected to an inner surface of the front panel 6. The first handle 12 ends can be interconnected to the front panel via reinforced cross-stitching 54 or other interconnection means, such as adhesives, bonding, stitching, and the like. The first end of the second handle 12 and the second end of the second handle 12 can be interconnected to the upper end or edge of the back panel 16 proximate the open end. In some embodiments, the first and second ends of the second handle 12 are interconnected to an inner surface of the back panel 16. The second handle 12 ends can be interconnected to the back panel via reinforced cross-stitching 56 or other interconnection means, such as adhesives, bonding, stitching, and the like. In other embodiments, the handles 12 may be stapled, hooked, etc. to the bag 10 or may be interconnected using snaps, buckles, zippers, or other fastening elements. In various embodiments, the handles 12 may be interconnected on an outer surface of the bag 10. Further, the height of the cross-stitching 54, 56 can be the same as the height of the stiffening hem 18.

In one embodiment, the handles 12 are comprised of a woven material, which can be woven nylon. Woven nylon tends to fray less than other materials used in the art. In an alternate embodiment, the handles 12 are comprised of a non-woven polypropylene material. In one embodiment, the handles 12 may be ropes, chains, or other strong material. The design of the bag 10, handles 12, material of the bag 10, material of the handles 12, and additional support elements allow the primary bag 10 to hold approximately 30 lbs to 50 lbs of weight.

In one embodiment, the carrying handles 12 are short for holding the handles 12 in a user's hands. For example, the short handles are about 8 inches to about 20 inches long in some embodiments, or about 12 inches long in a preferred embodiment. In another embodiment, the carrying handles 12 are long for putting the handles 12 over the user's shoulder. For example, the handles 12 are about 16 inches to about 34 inches long in one embodiment; about 22 inches to about 28 inches long in a preferred embodiment; or about 25 inches long in a more preferred embodiment. Each handle 12 has opposite ends respectively, secured to the sidewall 6, 16 to form a flexible loop that is easily extended when the bag 10 is carried or conveniently rolled or folded inside the main bag 10 for storage. In one embodiment, each handle 13 encircles the bag to provide extra support for carrying heavy items. In one embodiment, the handles 13 are 20" long.

In some embodiments, the handles 12 may comprise an interconnection device 64 with snaps, hook and loop material (e.g., Velcro), or other connection mechanisms to detachably interconnect the handles 12 together for easy carrying and to contain the handles 12. The interconnection device 64 can also be used to detachable secure the primary bag 10 and/or system 1 to a user's car, trunk, or shopping cart (see FIG. 9). See the description associated with FIG. 3 for more information on the interconnection device.

The primary bag 10 further comprises dividers 130 forming compartments 14 within the cavity of the primary bag 10. The primary bag 10 can have any number of compartments 14, for example, two, three, four, six, eight, ten, or twelve compartments, which can be formed by permanent, moveable, or removable dividers 130 or walls. The dividers 10 can be made of the same material as the main bag 10 or the dividers can be made of a stronger and/or stiffer material than the main bag. In some embodiments, one or more dividers 130 are sewn with stitching 50, 52 to one or more sidewalls 2, 6, 16 of the primary bag 10 to form compartments 14 for storing secondary bags 20, 30, 40 and other items. Each compartment 14 is large enough to store at least one secondary bag 20, 30, 40.

In one embodiment, the dividers 130 extend from the closed end at the bottom 4 of the primary bag 10 to the opposite open end proximate the upper edge. In another embodiment, the dividers 130 extend from a point above the closed end at the bottom 4 of the primary bag 10 to a point below the opposite open end, as at least partially shown in FIG. 2. In one embodiment, the dividers 130 extend from between about 2 inches and about 6 inches above the closed end at the bottom 4 of the primary bag 10 to a point between about 0.5 inches and about 2 inches below the opposite open end. In a preferred embodiment, the dividers 130 extend from between about 3 inches and about 5 inches above the closed end at the bottom 4 of the primary bag 10 to a point between about 0.75 inches and about 1.5 inches below the opposite open end. In a more preferred embodiment, the dividers 130 extend from about 4 inches above the closed end at the bottom 4 of the primary bag 10 to a point about 1 inch below the opposite open end. The dividers 130 may not extend to the bottom 4 or closed end of the bag 10 in order to allow a stiff bottom insert to be inserted into the primary bag 10. The dividers 130 may be sewn to an inner surface of the sidewalls 2, 6, 16 of the primary bag 10 using stitching 50, 52 or other attaching mechanisms. In some embodiments, a first end of one or more dividers 130 is interconnected to the inner surface of the side panel 2 via stitching 50 and a second end of the one or more dividers 130 is interconnected to the inner surface of the opposite side panel 2 via stitching 50. The dividers 130 may extend downward and upward only as far as the stitching 50 extends. Thus, in the embodiment shown, the dividers 130 may extend from a height above the bottom panel 4 to a distance below the upper edged of the side panels 2. The distance below the upper edge may be equal to the height of the stiffening hem 18. Additionally, a first end of one or more dividers 130 is interconnected to the inner surface of the front panel 6 via stitching 52 and a second end of the one or more dividers 130 is interconnected to the inner surface of the back panel 16 via stitching 52 such that these dividers are substantially perpendicular to the one or more dividers 130 interconnected to the two side panels 2. The dividers 130 may extend downward and upward only as far as the stitching 52 extends. Thus, in the embodiment shown, the dividers 130 may extend from a height above the bottom panel 4 to a distance below the upper edges of the front panel 6 and back panel 16. The distance below the upper edge may be equal to the height of the stiffening hem 18. Accordingly, the divider stitching 50, 52 may stop at the top fold stitching line 70.

In various embodiments, channel walls extend parallel to the front panel 6 and are interconnected at a first end to an inner surface of a first side panel 2 and interconnected at a second end to an inner surface of a second side panel 2 to form a channel 58 running substantially parallel to the front panel 6. Alternatively, the channel may run parallel to the side panels 2. Further, some dividers 130 are interconnected on a first end to the front panel 6 and interconnected on a second end to a first channel wall. Other dividers 130 are interconnected on a first end to the back panel 16 and interconnected on a second end to a second channel wall.

In various embodiments, the dividers 130 are positioned such that the walls of the dividers 130 are parallel to the sidewalls 2, 6, 16 of the primary bag 10. Thus, the compartments 14 formed by the dividers 130 are vertical and extend in a direction parallel to the vertical axis of the primary bag 10. In one embodiment, the dividers 130 are permanently attached to the sides 2, front 6, back 16, and/or bottom 4 of the primary bag 10. In another embodiment, the dividers 130 are removable. The dividers 130 may slide into grooves in the primary bag 10, may be sized to fit in the primary bag 10 without grooves or other positioning mechanism, or may snap, clip, or zip into the primary bag 10. In one embodiments, the dividers 130 are fixed on one side (e.g., secured to the inner surface of the front 6 of the bag 10) and detachable on the opposite side (e.g., detachable from the inner surface of the back 16 of the main bag 10). In other embodiments, some dividers 130 are fixed to the primary bag 10 while other dividers 130 are not fixed to the primary bag 10. For example, if divider n (where n is the divider number) is fixed, then divider n+1 is not fixed to the primary bag 10.

In yet another embodiment, the dividers 130 may be positioned to form compartments 14 or may be folded or collapsed and slid to the side such that the primary bag 10 has one large open compartment and so that the primary bag 10 may be folded flat for storage. The dividers 130 may add support or structure to the primary bag 10 primary bag 10 to keep the bag 10 open.

In one embodiment, the dividers 130 form compartments 14 that are all one size and shape. In another embodiment, the dividers 130 form compartments 14 that are different shapes and sizes to accommodate differently sized shopping bags or other items.

In some embodiments, the dividers 130 may be cardboard, plastic, or another sturdy material. Alternatively, the dividers 130 may be rods or poles. In one embodiment, the rods or poles comprise many differently sized rods that telescope open to an extended position and collapse into one another to allow for folding and storage. Alternatively, the rods or poles may have rope or string within their centers to disassemble into multiple small pieces and easily reassemble into dividers 130 without losing the small pieces. Thus, the rods or poles with string may work much like a tent pole. In one embodiment, the tent pole-like rods may pop or spring open to expand the bag 10 into an open position. Then a user could detach or disassemble the tent pole-like rods to fold the primary bag 10 and lay it flat for storage. Tent poles are known and any such pole could be used.

In one embodiment, the system may comprise a divider structure 130 that can be inserted into any reusable bag to create the bag storage system 1. A user would only have to purchase the divider 130 and insert it into a bag sized to accommodate the divider 130. The divider 130 may fold flat for shipping and storage. Alternatively, the insert may have a center piece and pockets on each side of the insert. Accordingly, the user could put the insert into a reusable bag and store other reusable bags within the pockets. Further, the system could include two inserts with pockets on one side of each insert such that a user would put one insert into a reusable bag along one side of the bag and put the other insert into the bag along another side of the bag. The inserts may be positioned parallel to one another or perpendicular to one another depending on sizing and preference.

In a further embodiment, straps (such as elastic bands) may be sewn into the sidewalls of the primary bag 10. These straps (not shown) may be on the inside of the primary bag 10 or the outside of the primary bag 10. The straps are stretchy and can hold one or more rolled up secondary bags 20, 30, 40.

In some embodiments (not shown), an interior, flexible bag of substantially the same size and shape as the primary bag 10 (or maybe slightly smaller) is inserted and secured into the hollow interior of the primary bag 10 to reinforce the primary bag 10 and to form four to twelve elongated storage compartments 14. The interior bag is stitched or glued to the primary bag 10 at four to eight equally-spaced seams, which extend axially between the bottom 4 of the primary bag 10 and the open end of the primary bag 10. The seams are peripherally positioned at each of the four vertical corners and midway or a third of the way along each of the sidewalls 2, 6, 16. In addition to forming the storage compartments between the interior bag and the primary bag 10, the seams secure together multiple layers of material and serve as stiffening elements that give the sidewalls sufficient stiffness such that primary bag 10 can stand by itself with the open end open to receive shopping items or secondary reusable bags 20, 30, 40. Additionally, the center of the interior bag may be empty so that shopping items, purses, phones, wallets, toys, games, tablets, keys, gloves, scarves, hats, sunglasses, etc., may be contained within the bag, while secondary reusable bags 20, 30, 40 are retained in the compartments between the interior bag and the primary bag 10. Alternatively, a divider may be placed or secured (either permanently or removably) into the center compartment of the interior bag for the storage of additional bags or to keep shopping items or personal items separate from one another.

In various embodiments, the primary bag 10 may be made of canvas, polyester, nylon, plastic, non-woven polypropylene, woven synthetic materials, mesh, or any other material. In one embodiment, the primary bag 10 is formed from a sturdy fabric defining a bottom 4 (also called a base herein) and sidewalls 6, 2, 16. In some embodiments, the primary bag 10 is comprised of about 80 gsm to about 150 gsm non-woven polypropylene. In one embodiment, the primary bag 10 is comprised of a non-woven laminate material that is between about 75 gsm and about 195 gsm. Further, the material may be a matte laminate material. In a preferred embodiment, the primary bag 10 is comprised of a non-woven laminate material that is between about 95 gsm and about 175 gsm. In a more preferred embodiment, the primary bag 10 is comprised of a non-woven laminate material that is between about 125 gsm and about 165 gsm. In a most preferred embodiment, the primary bag 10 is comprised of a non-woven laminate material that is about 150 gsm.

In various embodiments, the bottom 4 of the primary bag 10 may be a thicker or stronger material than the rest of the primary bag 10. This is so that the bag 10 can support and hold heavy items like beverages, liquids, bottles, and the like. In one embodiment, a sturdy bottom piece (also called a bottom insert herein) is removably inserted into the bottom 4 of the bag 10 and is positioned flat against the bottom 4 of the bag 10. This additional piece may be the same shape and size as the bottom 4 of the bag 10 and may add structure or support. The bottom insert, in some embodiments, is plastic, cardboard, metal, Styrofoam, or other rigid material. Additionally, the bottom insert may fold up against a sidewall 2, 6, 16 of the primary bag 10 such that the bag 10 can be folded and stored in a flat position. Alternatively, the bottom insert may be removable to allow the primary bag 10 to be stored in a flat position or to allow the bag 10 to be folded or rolled up for storage.

In some embodiments, the primary bag 10 may have one or more closure mechanisms to keep the primary bag 10 closed such that items within the bag 10 will not fall out. Thus, the primary bag 10 may have a closure mechanism that uses straps, flaps, snaps, hook and loop material, buttons, zippers, or claps. In one embodiment, the primary bag 10 can have a cover portion interconnected to one sidewall of the bag 10. The cover portion can have a snap, hook and loop material, or a button that engages with a snap, hook and loop material, or button slot on an opposite sidewall of the bag 10.

In one embodiment, the main bag 10 is an insulated bag. Insulated bags are known in the art and any known insulated bag may be used. Alternatively, the primary bag 10 may lined for increase structure, support, and/or insulation. In one embodiment, the insulation is at least one of spunlace foil and foam.

Figure 4:
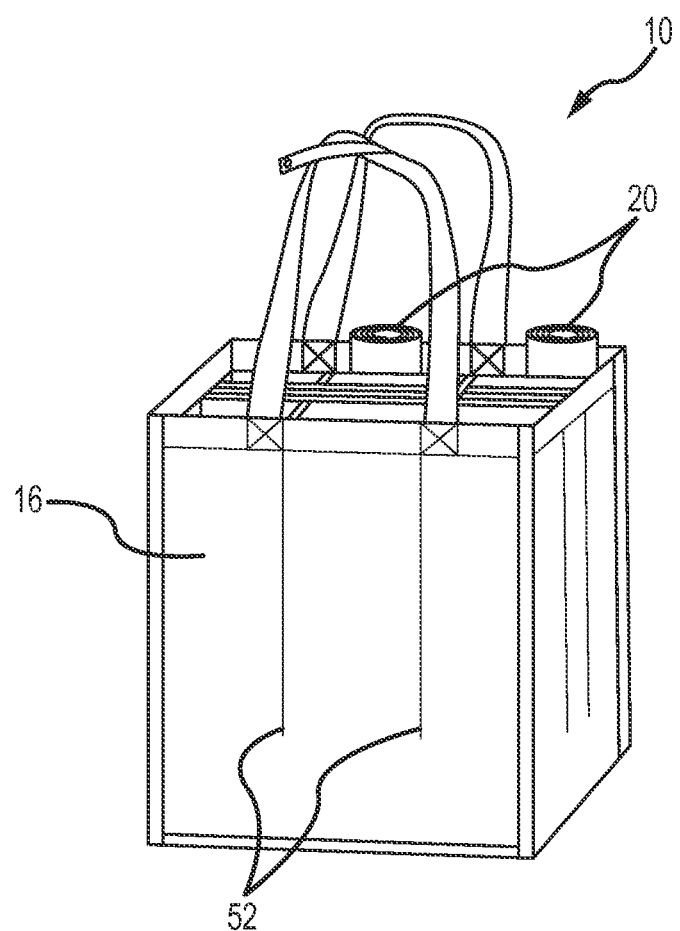
FIG. 4 shows a rear perspective view of the main holder bag holding multiple secondary bags.
Figure 5:
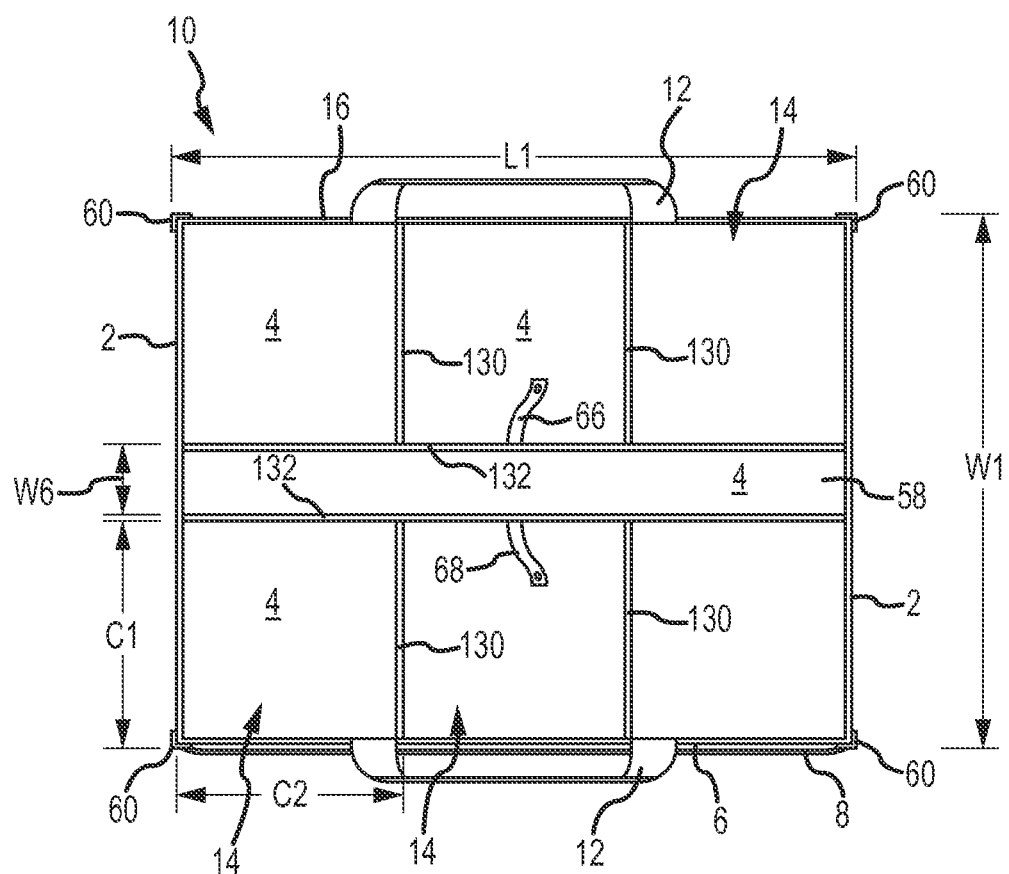
FIG. 5 shows a top plan view of the main holder bag.

In one embodiment, the primary bag 10 may be a different size. For example, the primary bag 10 may only have four compartments 14 and a channel 58 that is interconnected on one end to the front portion 6 of the main bag 10 and interconnected on a second end to the back portion 16 of the main bag 10. Thus, the channel 58 runs from the front of the bag 10 to the bag of the bag 10, rather than from side-to-side as shown in FIGS. 2 and 4-5.

Figure 3:
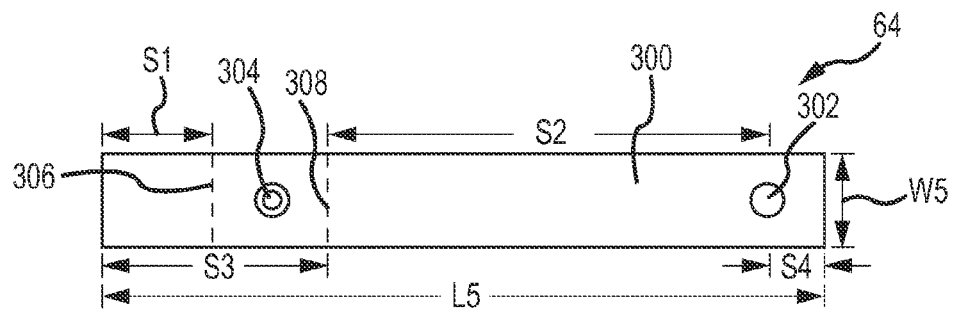
FIG. 3 shows one embodiment of the interconnection device.

FIG. 3 shows one embodiment of the interconnection device 64 for securing the primary bag 10 to a shopping cart, a trunk of a car, and/or an interior of a car. Additionally, the interconnection device can secure the handles 12 to one another for storage. In one embodiment, the interconnection device 64 is interconnected to at least one handle 12 and comprises a strap 300, a male snap element 302, and a female snap element 304. In alternate embodiments, the interconnection device may comprise hook and loop material or other fasteners rather than the male snap element 302 and the female snap element 304. In the embodiment shown, the upper surface of the male snap element 302 is shown and is positioned proximate to a second end of the strap 300. Further, the bottom surface of the female snap element 304 is shown proximate to a first end of the strap 300. Therefore, the second end of the strap 300 is looped around such that the bottom surface of the male snap element 302 (on the back of the strap 300, not shown) can be snapped into the bottom surface of the female snap element 304 (on the front of the strap 300, shown). The snap elements 302, 304 may be metal or plastic material.

The strap 300 is interconnected to a handle 12 by folding the first end at the fold line 306, placing the handle 12 width between the folded first end and the portion of the strap with the female snap element 304, and sewing or securing the first end of the strap 300 to a portion of the strap 300 proximate to the stitching line 308. The strap 300 can be secured using stitching, glue, clips, staples, and other securing mechanisms known in the art. Further, in one embodiment, the interconnection device 64 can slide along the handle 12, while in other embodiments, the interconnection device 64 is attached to a portion of the handle 12. The interconnection device 64 may be attached to a center portion of the handle 12 in various embodiments. The strap 300 can be made of a woven nylon material in one embodiment, or other woven material in other embodiments. Woven nylon tends to fray less than other materials used in the art. In another embodiment, the strap is a non-woven polypropylene material. In further embodiments, the handles are comprised of any material known in the art.

In one embodiment, the length L5 of the strap 300 is between about 4 inches and about 12 inches. In a preferred embodiment, length L5 of the strap 300 is between about 6 inches and about 10 inches. In a more preferred embodiment, length L5 of the strap 300 is between about 7 inches and about 9 inches. In a most preferred embodiment, length L5 of the strap 300 is about 8 inches. In one embodiment, the width W5 of the strap 300 is between about 0.5 inches and about 1.5 inches. In a preferred embodiment, width W5 of the strap 300 is between about 0.75 inches and about 1.25 inches. In a more preferred embodiment, width W5 of the strap 300 is about 1.0 inch.

In one embodiment, the fold line 306 is a distance S1 of between about 0.75 inches and about 1.75 inches from the first end of the strap 300. In a preferred embodiment, the fold line 306 is a distance S1 of between about 1.0 inch and about 1.5 inches from the first end of the strap 300. In more preferred embodiment, the fold line 306 is a distance S1 of about 1.25 inches from the first end of the strap 300. In one embodiment, the stitching line 308 is a distance S3 of between about 1.5 inches and about 3.5 inches from the first end of the strap 300. In a preferred embodiment, the stitching line 308 is a distance S3 of between about 2.0 inches and about 3.0 inches from the first end of the strap 300. In more preferred embodiment, the stitching line 308 is a distance S3 of about 2.5 inches from the first end of the strap 300.

In one embodiment, the distance S2 between the stitching line 308 and the center of the male snap element 302 is between about 3 inches and about 7 inches. In a preferred embodiment, the distance S2 between the stitching line 308 and the center of the male snap element 302 is between about 4 inches and about 6 inches. In more preferred embodiment, the distance S2 between the stitching line 308 and the center of the male snap element 302 is about 5 inches. In one embodiment, the distance S4 between the second end of the strap 300 and the center of the male snap element 302 is between about 0.25 inches and about 1.0 inch. In a preferred embodiment, the distance S4 between the second end of the strap 300 and the center of the male snap element 302 is between about 0.4 inches and about 0.75 inches. In more preferred embodiment, the distance S4 between the second end of the strap 300 and the center of the male snap element 302 is about 0.5 inches.

FIG. 4 shows a rear perspective view of the primary bag 10 holding multiple secondary bags 20. The back panel 16 of the primary bag 10 can be seen in this view. Additionally, the divider stitching 52 is also visible on the back panel 16 of the bag 10. Here, two secondary bags 20 are rolled and stored in compartments 14 of the primary bag 10. In one embodiment, the rolled-up secondary bags 20 will stick out above the upper edge of the primary bag 10, which assists in pulling the secondary bags 20 out of the compartments 14 of the primary bag 10. The secondary bags 20 may stick out above the upper edge of the primary bag 10 about 1.0 inch. Additionally, having the dividers 130 stop a distance below the upper edge of the primary bag 10 further assists a user in pulling the secondary bag 20 out of the compartment 14 of the primary bag 10.

In use, a user may fill one or more compartments 14 within the primary bag 10 with reusable shopping bags 20. The reusable bags 20 may be rolled or folded and placed in the compartments 14. The secondary bag 20 may comprise snap closures, snaps, clips, magnets, or hook and loop material (e.g., Velcro) to keep the bag 20 in a rolled or folded configuration and so that the secondary bag 20 easily slides into the compartments 14 of the main bag 10.

FIG. 5 shows a top plan view of the primary bag 10. The primary bag 10 comprises a front panel 6, a first side panel 2, a second side panel 2, a back panel 16, a bottom panel 4, side piping 60, two handles 12, a pocket 8, dividers 130 forming compartments 14, two channel walls 132 forming a channel 58, and a closure mechanism having a first part 66 and a second part 68. The channel 58 is designed to store a folded secondary bag. Specifically, the channel is designed to store at least one folded insulated bag 30.

The primary bag 10 has a height H1, a length L1, and a width W1, dimensions for which were given above in connection with FIG. 2. In one embodiment, the width W6 of the channel 58 is between about 0.5 inches and about 1.5 inches. In a preferred embodiment, the width W6 of the channel 58 is between about 0.75 inches and about 1.25 inches. In a more preferred embodiment, the width W6 of the channel 58 is about 1.0 inch. In one embodiment, the length C2 of the compartment 14 is between about 1.5 inches and about 4.5 inches. In a preferred embodiment, the length C2 of the compartment 14 is between about 2.5 inches and about 3.5 inches. In a more preferred embodiment, the length C2 of the compartment 14 is about 3.0 inches. In one embodiment, the width C1 of the compartment 14 is between about 1.5 inches and about 4.5 inches. In a preferred embodiment, the width C1 of the compartment 14 is between about 2.5 inches and about 3.5 inches. In a more preferred embodiment, the width C1 of the compartment 14 is about 3.0 inches.

In some embodiments, the primary bag 10 includes a closure mechanism having a first part 66 and a second part 68. The first part 66 of the closure mechanism comprises a strap having a proximal end interconnected to the first channel wall 132 proximate to a center of an upper edge of the first channel wall 132 and a distal end opposite the proximal end, where the distal end includes a fastener. The second part 68 of the closure mechanism comprises a strap having a proximal end interconnected to the second channel wall 132 proximate to a center of an upper edge of the second channel wall 132 and a distal end opposite the proximal end, where the distal end includes a fastener adapted to mateably receive the fastener of the first strap.

Figure 6:
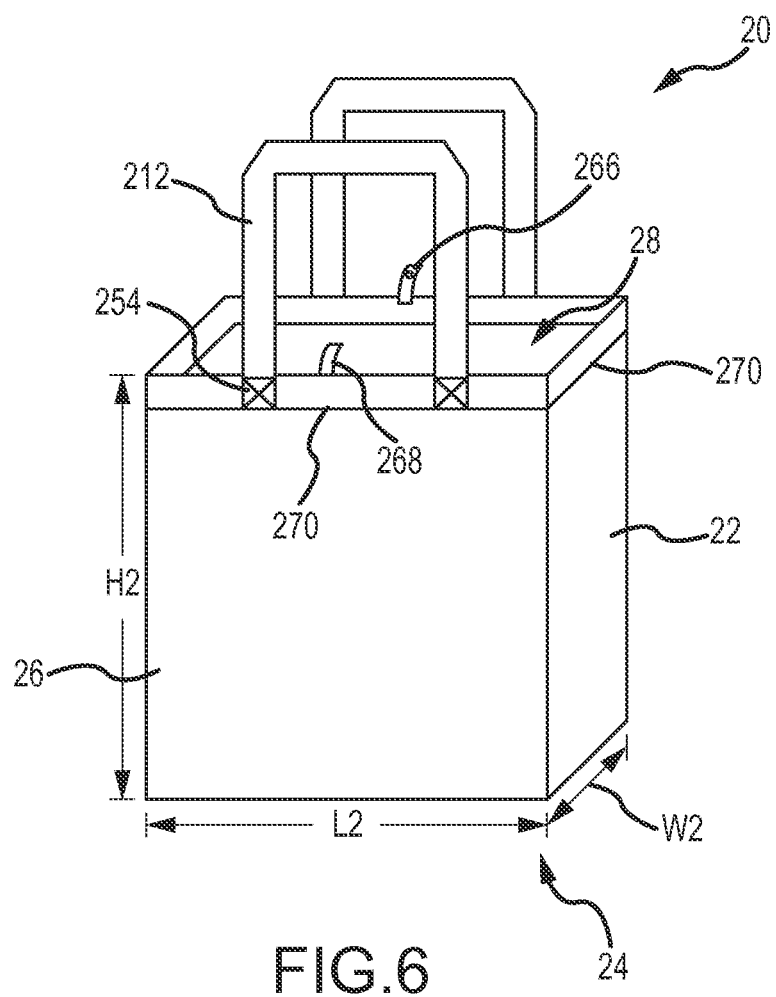
FIG. 6 shows one embodiment of the secondary bag.

FIG. 6 shows one embodiment of the secondary bag, where the secondary bag is a reusable bag 20. The reusable bag 20 comprises a front 26, a back opposite the front, two sides 22 between the front 26 and back, and a bottom 24, all of which form a cavity 28. In some embodiments, the reusable bag 20 also has one or more handles 212, one or more pockets, and/or interconnection devices 266, 268, such as zippers, Velcro, tabs, or clips. In the embodiment shown, the reusable bag 20 includes a pair of carrying handles 212. Each handle 212 has a first end and a second end. The first end of the first handle 212 and the second end of the first handle 212 can be interconnected to the upper end or edge of the front 26 proximate the open end. In some embodiments, the first and second ends of the first handle 212 are interconnected to an outer surface of the front 26. The first handle 212 ends can be interconnected to the front panel via reinforced cross-stitching 254 or other interconnection means, such as adhesives, bonding, stitching, and the like. The first end of the second handle 212 and the second end of the second handle 212 can be interconnected to the upper end or edge of the back proximate the open end. In some embodiments, the first and second ends of the second handle 212 are interconnected to an outer surface of the back. The second handle 212 ends can be interconnected to the back via reinforced cross-stitching or other interconnection means, such as adhesives, bonding, stitching, and the like. In other embodiments, the handles 212 may be stapled, hooked, etc. to the bag 20 or may be interconnected using snaps, buckles, zippers, or other fastening elements. In various embodiments, the handles 212 may be interconnected on an inner surface of the bag 20.

In the embodiment shown, the handles 212 are designed to allow a user to wear the handles on his/her shoulder for ease of carrying the bags 20. In other embodiments, the handles may be shorter (e.g., about 8 inches to about 12 inches long) such that the user can carry the bags 20 by holding the handle 212 in his/her hand. In one embodiment, the handles 212 are between about 18 inches and about 24 inches long. In a preferred embodiment, the handles 212 are between about 20 inches and about 22 inches long. In more preferred embodiment, the handles 212 are about 21 inches long. Further, the height of the cross-stitching 254 can be the same as the height of the stiffening hem defined by the top fold stitching line 270. In one embodiment, the handles 212 may be ropes, chains, or other strong material. The design of the bag 20, handles 212, material of the bag 20, material of the handles 212, and possible support elements allow the secondary reusable bag 20 to hold approximately 20 lbs to 30 lbs of weight.

The reusable bag 20 has a height H2, a length L2, and a width W2. In one embodiment, the height H2 of the reusable bag 20 is between about 10 inches and about 20 inches. In a preferred embodiment, the height H2 of the reusable bag 20 is between about 12 inches and about 18 inches. In a more preferred embodiment, the height H2 of the reusable bag 20 is between about 14 inches and about 16 inches. In a most preferred embodiment, the height H2 of the reusable bag 20 is about 15 inches. In one embodiment, the length L2 of the reusable bag 20 is between about 10 inches and about 18 inches. In a preferred embodiment, the length L2 of the reusable bag 20 is between about 12 inches and about 16 inches. In a more preferred embodiment, the length L2 of the reusable bag 20 is about 14 inches. In one embodiment, the width W2 of the reusable bag 20 is between about 5 inches and about 11 inches. In a preferred embodiment, the width W2 of the reusable bag 20 is between about 7 inches and about 9 inches. In a more preferred embodiment, the width W2 of the reusable bag 20 is about 8 inches.

In some embodiments, a top edge of one or more sidewalls 26, 22 is folded down and inward along a circumferentially extending fold line, substantially parallel to the horizontal corners, and sewn at the top fold stitching line 270 to the respective panel 26, 22 to create a strengthening and stiffening hem with a height. In one embodiment, the front 26 and the back each have a stiffening hem proximate to the open end and that is glued or sewn at the top fold stitching line 270. In additional or alternative embodiments, the upper edges of the side 22 also have a folded section that is sewn or glued at the top fold stitching line 270 to create a strengthening and stiffening hem with a height. In one embodiment, the height of the stiffening hem is between about 2.5 inches and about 0.5 inches. In a preferred embodiment, the height of the stiffening hem is between about 1.5 inches and about 0.75 inches. In a more preferred embodiment, the height of the stiffening hem is about 1 inch.

In the embodiment shown, the reusable shopping bag 20 comprises a closure mechanism with a first portion 268 and a second portion 266. The first portion 268 of the closure mechanism has a strap with a proximal end interconnected to the front 26 proximate to the open end and a distal end opposite the proximal end, where the distal end includes a fastener. The second portion 266 of the closure mechanism has a strap with a proximal end interconnected to the back proximate to the open end and a distal end opposite the proximal end, where the distal end includes a fastener adapted to mateably receive the fastener of the strap of the first portion 268.

In some embodiments, the reusable bag 20 may comprise snap closures, snaps, clips, magnets, or hook and loop material (e.g., Velcro) to keep the reusable bag 20 in a rolled or folded configuration and so that the reusable bag 20 easily slides into the compartments 14 of the main bag 10. Thus, the reusable bag 20 may have two tabs or straps on the top (open) end of a sidewall (e.g., the back of the bag 20) or one tab on two sidewalls (e.g., the front 26 and back of the bag 20), where each tab has a snap piece—either a female snap piece or a male snap piece. Once the reusable bag 20 is rolled, the tabs may encircle the rolled bag 20 and interconnect with each other to keep the reusable bag 20 in a rolled configuration. Alternatively, the bag can be rolled and kept closed using magnets or snaps. Further, the bag can be rolled and kept closed using or hook and loop material positioned where snap is positioned and interconnecting to a tab with hook and loop material positioned where tabs are positioned. A similar system can be contemplated with folding the reusable bag 20 and interconnecting one part (e.g., a snap, magnet, button, or tab) of the folded bag to another part (e.g., snap or button) of the folded reusable bag 20.

In some embodiments the reusable bag 20 is 80 gsm to 100 gsm non-woven polypropylene. In various embodiments, the reusable bag 20 is comprised of about 80 gsm to about 150 gsm non-woven polypropylene. In one embodiment, the reusable bag 20 is comprised of a non-woven laminate material that is between about 75 gsm and about 175 gsm. Further, the material may be a matte laminate material. In a preferred embodiment, the reusable bag 20 is comprised of a non-woven laminate material that is between about 95 gsm and about 145 gsm. In a more preferred embodiment, the reusable bag 20 is comprised of a non-woven laminate material that is between about 110 gsm and about 130 gsm. In a most preferred embodiment, the reusable bag 20 is comprised of a non-woven laminate material that is about 120 gsm.

Figure 7:
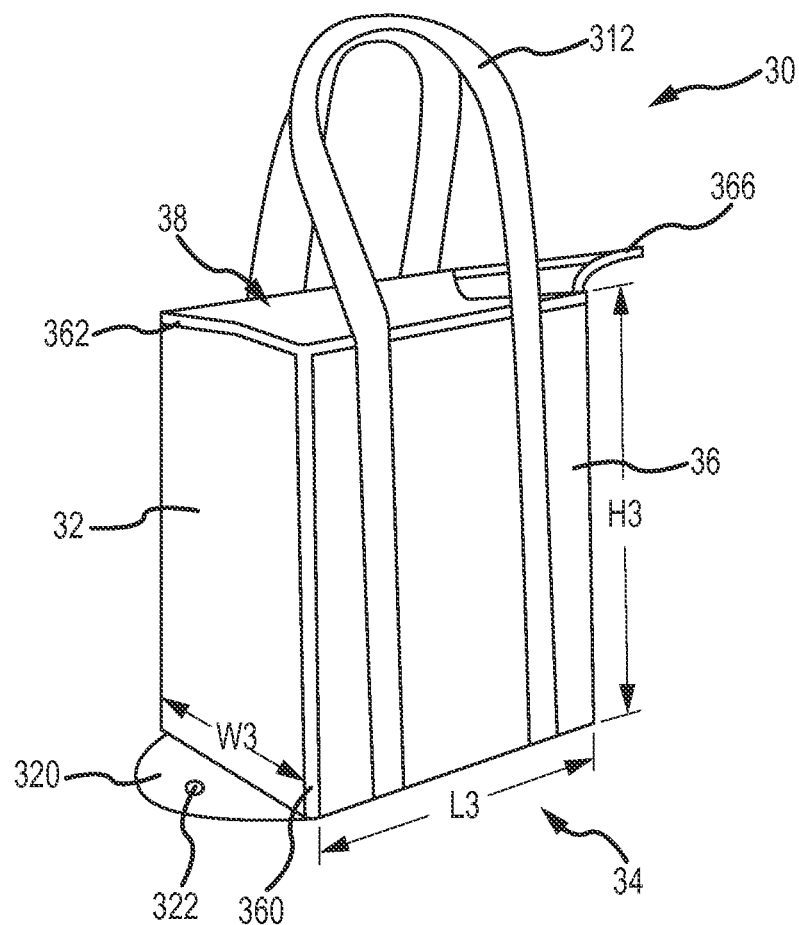
FIG. 7 shows a second embodiment of the secondary bag.

FIG. 7 shows a second embodiment of the secondary bag, where the secondary bag is an insulated bag 30. The insulated bag 30 comprises a front 36, a back opposite the front, two sides 32 between the front 36 and back, and a bottom 34, all of which form a cavity 38 having an open end and a closed end. The insulated bag 30 also includes an insulating material positioned on an inner surface of the front 36 and an inner surface of the back of the bag 30. Further embodiments may also include insulating material on the sides 32 of the bag 30. In some embodiments, the insulated bag 30 also has one or more handles 312, one or more pockets, and/or one or more interconnection devices 366, such as zippers, Velcro, tabs, or clips.

In the embodiment shown, the insulated bag 30 includes a pair of carrying handles 312, which are designed to allow a user to wear the handles on his/her shoulder for ease of carrying the insulated bag 30. Each handle 312 has a first end and a second end. In other embodiments, the handles 312 may be shorter (e.g., about 8 inches to about 12 inches long) such that the user can carry the bag 30 by holding the handle 312 in his/her hand. In one embodiment, the handles 312 are between about 16 inches and about 24 inches long. In a preferred embodiment, the handles 312 are between about 18 inches and about 22 inches long. In more preferred embodiment, the handles 312 are about 20 inches long. In one embodiment, the handles 312 may be ropes, chains, or other strong material. The design of the bag 30, handles 312, material of the bag 30, material of the handles 312, and possible support elements allow the insulated bag 30 to hold approximately 35 lbs to 40 lbs of weight.

The first end of the first handle 312 and the second end of the first handle 312 can be interconnected to the outer surface of the front 36 proximate the closed end and extending from the closed end to the open end. The first handle 312 ends can be interconnected to the front 36 via stitching or other interconnection means, such as adhesives, bonding, stitching, and the like. Additionally, the first handle 312 may be secured to the outer surface of the insulated bag 30 using stitching or adhesives along the entire portion of the first handle 312 that is in contact with the outer surface of the bag 30. The first end of the second handle 312 and the second end of the second handle 312 can be interconnected on a first end to an outer surface of the back proximate the closed end and extending from the closed end to the open end. The second handle 312 ends can be interconnected to the back via stitching or other interconnection means, such as adhesives, bonding, stitching, and the like. Additionally, the second handle 312 may be secured to the outer surface of the bag 30 using stitching or adhesives along the entire portion of the second handle 312 that is in contact with the outer surface of the bag 30. In other embodiments, the handles 312 may be stapled, hooked, etc. to the bag 30 or may be interconnected using snaps, buckles, zippers, or other fastening elements. In various embodiments, the handles 312 may be interconnected on an inner surface of the insulated bag 30. Further, the handles 312 may extend from the closed end of an inner surface of the insulated bag 30 to the open end of the bag and loop around and back down to the closed end of the inner surface of the bag 30. Extending the handles 312 to the closed end of the bag 30 provides additional support, allows the bag 30 to hold more weight, and assists in securing the lining to the sidewalls. In alternative embodiments, the handles 312 may be secured to the insulated bag 30 using reinforced cross-stitching positioned proximate to the open end of the bag 30 or proximate to the closed end of the bag 30. In one embodiment, the handles 312 may be ropes, chains, or other strong material.

For support and to add structure, the insulated bag 30 may have wires, dowels, rods, tubes, bars, strengthening and stiffening hems, tubing, piping, or other stiffening mechanisms or support elements to keep the insulated bag 30 standing upright and/or open. In the embodiment shown, the insulated bag 30 has side piping 360 along one or more vertical corners of the insulated bag 30 and top piping 362 along one or more upper edges of the bag 30. Piping or other support elements may also be positioned in the horizontal corners of the bag 30 proximate to the closed end. The support elements or piping 360, 362 may be glued or sewn into the insulated bag 30 or they may be slid into channels via openings in the corners. In some embodiments, the support elements are removable. Having the support elements in the vertical and/or horizontal corners allows the bag 30 to fold flat but also stand upright when need be. Further, the piping 360, 362 or support elements may have breaks along the length, width, or height of the bag 30 to allow the user to fold the insulated bag 30 and store it in the primary bag 10.

The insulated bag 30 has a height H3, a length L3, and a width W3. In one embodiment, the height H3 of the insulated bag 30 is between about 9 inches and about 17 inches. In a preferred embodiment, the height H3 of the insulated bag 30 is between about 11 inches and about 15 inches. In a more preferred embodiment, the height H3 of the insulated bag 30 is between about 12 inches and about 14 inches. In a most preferred embodiment, the height H3 of the insulated bag 30 is about 13 inches. In one embodiment, the length L3 of the insulated bag 30 is between about 8 inches and about 16 inches. In a preferred embodiment, the length L3 of the insulated bag 30 is between about 10 inches and about 14 inches. In a more preferred embodiment, the length L3 of the insulated bag 30 is about 12 inches. In one embodiment, the width W3 of the insulated bag 30 is between about 5 inches and about 11 inches. In a preferred embodiment, the width W3 of the insulated bag 30 is between about 7 inches and about 9 inches. In a more preferred embodiment, the width W3 of the insulated bag 30 is about 8 inches.

In the embodiment shown, the insulated bag 30 comprises a closure mechanism 366 proximate to the open end of the bag 30 and interconnected to at least the upper edge of the front 36 and the upper edge of the back. In one embodiment, the closure mechanism 366 is a zipper.

In some embodiments the insulated bag 30 is comprised of non-woven polypropylene material between about 50 gsm and about 120 gsm. In a preferred embodiment, the insulated bag 30 is comprised of non-woven polypropylene material between about 60 gsm and about 105 gsm. In a preferred embodiment, the insulated bag 30 is comprised of non-woven polypropylene material between about 70 gsm and about 90 gsm. In a more preferred embodiment, the insulated bag 30 is comprised of a non-woven polypropylene material that is about 80 gsm. Additionally, the insulating material can be at least one of foil, spunlace foil, foam, and any other known insulating material.

In some embodiments, the insulated bag 30 has a snap closure, Velcro, clip, snap, button, zipper, hook, belt, etc. to keep the bag 30 in a rolled-up or folded position. For example, the insulated bag 30 may have a flap 320 with a closure mechanism 322. The flap 320 can be positioned on a first side 32 of the bag 30 proximate the closed end of the bag 30. The closure mechanism 322 can be a snap or hook material that engages with another snap or loop material on a different side of the bag 30. Thus, the opposite side of the bag (i.e., the second side of the bag 30, not shown) may also have a flap with a closure mechanism positioned proximate the closed end of the bag 30. In other embodiments, the insulated bag 30 may not have mechanism to keep the insulated bag 30 in a folded position.

In some embodiments, the insulated bag 30 also includes a sturdy bottom insert. In one embodiment, the rolled up insulated bag 30 may be stored in one of the main bag's compartments 14. In an alternative embodiment, the folded insulated bag 30 is stored in a channel in the primary bag 10. The channel may be positioned between the compartments 14 of the primary bag 10 to store the folded or rolled up insulated bag 30 or any other personal items or shopping items. The channel may run the length of the primary bag 10 or the width of the primary bag 10 and may be positioned between the dividers 130. In another embodiment, the folded or rolled up insulated bag 30 is stored in an outer pocket 8 of the primary bag 10. In a further embodiment, the rolled-up or folded insulated bag 30 is stored in an internal pocket of the primary bag 30.

Figure 8:
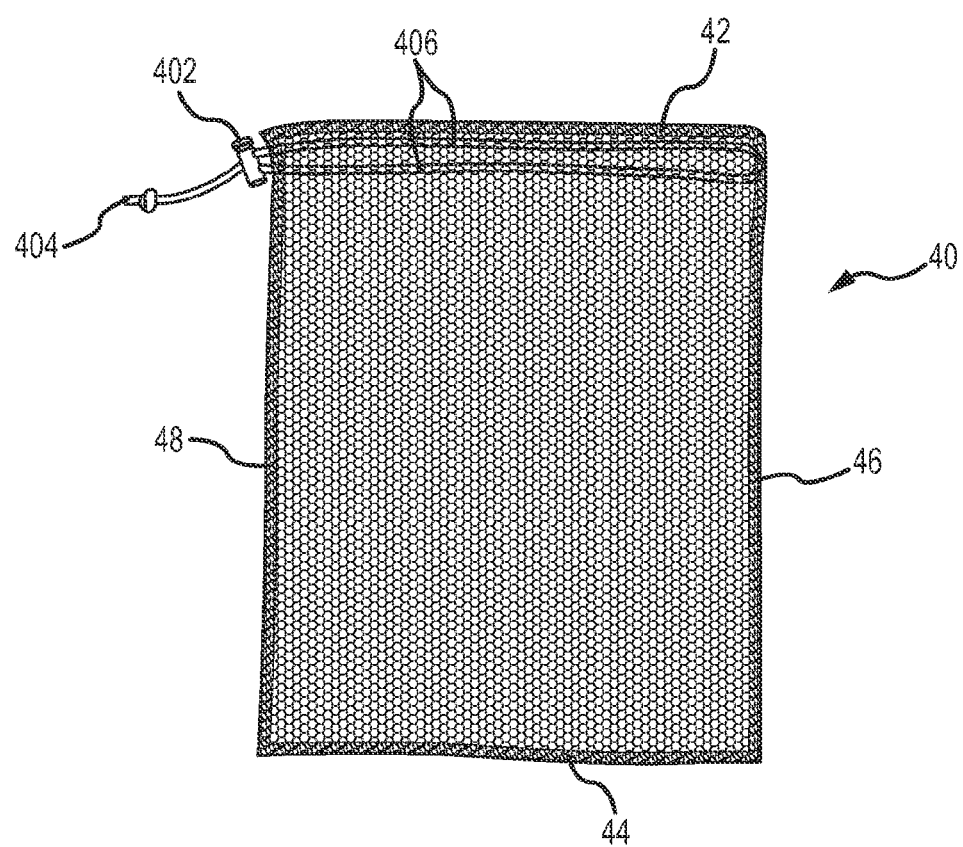
FIG. 8 shows a third embodiment of the secondary bag.

FIG. 8 shows a third embodiment of the secondary bag, where the secondary bag is a produce bag 40. Even though the produce bag 40 is called a produce bag 40, it may hold items other than produce. Thus, the bag 40 may be a mesh material or other breathable material that is well suited for holding produce. The produce bag 40 may be rolled up or folded and stored in the primary bag 10. Alternatively, two produce bags 40 may be rolled up and stored in a pocket 8 of the primary bag 10. In some embodiments, the produce bag 40 may have a snap, Velcro, clip, button, zipper, hook, belt, etc. to keep the bag in a rolled-up or folded position. In one embodiment, the rolled-up produce bag 40 may be stored in one of the primary bag's compartments 14. In another embodiment, the folded or rolled-up produce bag 40 may be stored in a pocket 8 of the main bag 10. The pocket may be an internal pocket or external pocket 8.

In some embodiments, the produce bag 40 comprises two pieces of material interconnected along an edge at the bottom 44 of the bag 40, along an edge of the first side 46 of the bag 40, and along an edge of the second side 48 of the bag 40. The pieces may be interconnected using stitching, adhesives, or other known mechanisms in the art. In other embodiments, the produce bag 40 is comprised of one piece of material interconnected at the bottom 44 of the bag 40 and a side 46, 48 of the bag 40. The produce bag 40 has an opening at the top 42 of the bag 40 to allow access into the bag 40. Further, in some embodiments, the top 42 of the bag 40 has a closing device to close the opening. In one embodiment, the closing device includes a channel 406 for a draw string 404, where the draw string 404 can be tightened and secured using a closure mechanism 402. In one embodiment, the closure mechanism 402 is a ball stop closure.

In various embodiments, the produce bag 40 is comprised of a mesh material and can be used for produce, refrigerated items, or other applicable shopping items. In some embodiments the produce bag 40 is 100 percent nylon. In other embodiments, the produce bag 40 is another breathable material that allow air to flow through the bag.

In one embodiment, the produce bag 40 has a height between about 12 inches and about 16 inches and a width between about 10 inches and about 14 inches. In a preferred embodiment, the produce bag 40 has a height between about 13 inches and about 15 inches and a width between about 11 inches and about 13 inches. In a more preferred embodiment, the produce bag 40 has a height of about 14 inches and a width of about 12 inches.

Figure 9:
FIG. 9 shows a second embodiment of the reusable shopping bag system secured to a shopping cart.

FIG. 9 shows the reusable shopping bag system 1 secured to a shopping cart 90 via the interconnection device 64 on the primary bag 10. Although it is not shown, the reusable shopping bag system 1 can be secured to the inside or outside of the shopping cart 90 and may be secured to the cart's handle or the main basket of shopping cart 90. In various embodiments, the main primary bag 10 can have a mechanism 64 to temporarily secure the primary bag 10 filled with the secondary bags 20, 30, 40 and personal items to the user's shopping cart 90. Thus, the reusable shopping bag holder and system 1 may include a fastening assembly with a fastener capable of releasably securing the primary bag 10 to a shopping cart 90. In some embodiments, the reusable shopping bag holder and system 1 includes magnets to secure the primary bag 10 to a metal shopping cart. In one embodiment, the primary bag 10 has Velcro loops to secure the primary bag 10 to the user's shopping cart 90 while the user is shopping. In another embodiment, the primary bag 10 can have rigid hooks to secure the primary bag 10 to the user's shopping cart 90. In an additional embodiment, the rigid hooks may include hook material (i.e., the hook part of hook and loop material, or Velcro) on the outer surface of the rigid hooks such that the primary bag 10 may be secured to the back or trunk of a user's car by securing the hook material to a material surface of the user's vehicle. Alternatively, the handles 12 of the primary bag 10 may be tied to the user's shopping cart 90. Further, the reusable bag holder and system 1 may be secured to the inside of the shopping cart 90 or the outside of the shopping cart 90. These mechanisms may also be used to secure the primary bag 10 and system 1 to a specific location in the user's car or trunk.

Figure 10:
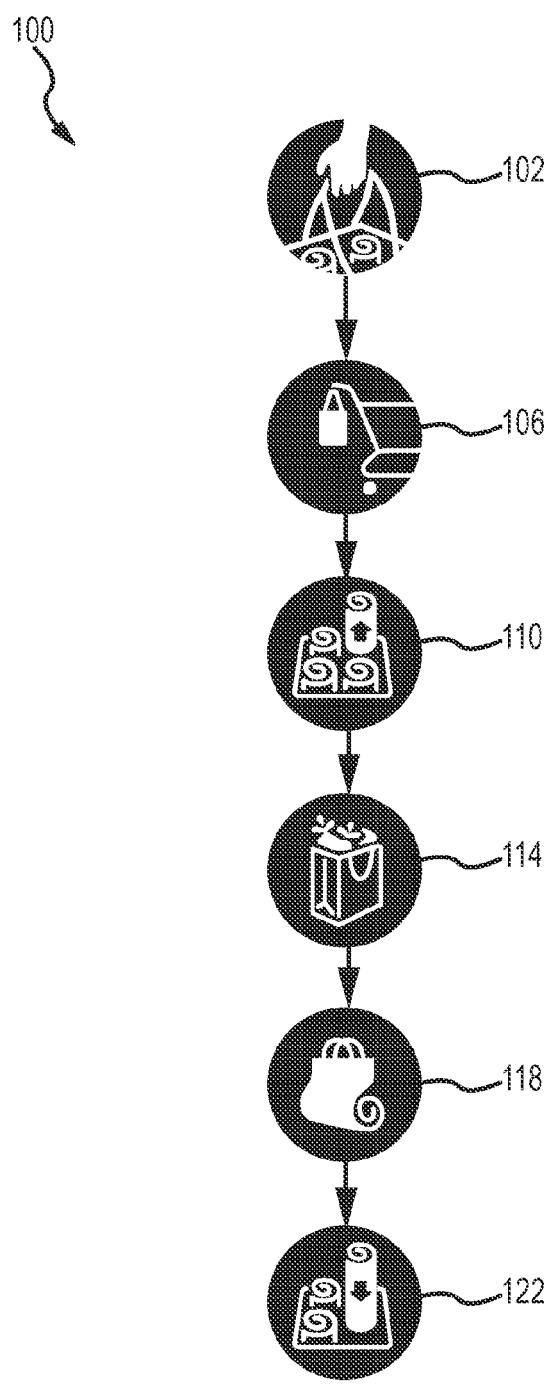
FIG. 10 shows a method of using the reusable shopping bag system.

FIG. 10 shows a method 100 of using the reusable shopping bag system. The method 100 includes providing a primary bag with a plurality of compartments and possibly a pocket and providing a plurality of secondary bags. The plurality of secondary bags may include reusable shopping bags, insulated bags, and/or mesh bags. The method 100 also includes storing each secondary bag in either the pocket of the primary bag or a compartment in the primary bag. The method 100 further includes the step 102 of getting the reusable shopping bag system and taking the reusable shopping bag system to the store. The next step 106 is securing the reusable shopping bag system to a shopping cart and shopping. Once shopping is complete, or while shopping, the user unpacks the secondary bags in step 110. This step 110 includes removing a first secondary bag from the primary bag, removing a second secondary bag from the primary bag, and so on. After checking out, the user can fill the secondary bag, and possibly the primary bag, with purchased items in step 114. Step 114 includes opening the first secondary bag, filling the first secondary bag with one or more purchased items, opening the second secondary bag, filling the second secondary bag with one or more purchased items, and so on until all needed bags are filled. Then, in step 118 the user empties the bags and folds or rolls up the secondary bags. This step 118 includes removing the one or more items from the first secondary bag, rolling or folding the first secondary bag, removing the one or more items from the second secondary bag, rolling or folding the second secondary bag, and so on until all bags are emptied and all secondary bags are folded or rolled up. In step 122, the user places the secondary bags into the primary bag for storage. This step 122 includes placing the rolled up or folded first secondary bag in either the pocket of the primary bag or an inner compartment of the primary bag; placing the rolled up or folded second secondary bag in either the pocket of the primary bag or a compartment of the primary bag, and doing to same for all remaining secondary bags.

In various embodiments, the bags may be made of a flexible woven material, non-woven material, all natural material, biodegradable material, material made from plant fibers, bamboo, leather, canvas, synthetic material, polypropylene, polyethylene terephthalate (recycled or not), polyester, shammy material (i.e., chamois leather or washleather), or any other known material commonly used for reusable bags. The primary bag 10 and/or all bags 10, 20, 30, 40 may be made of a non-woven fabric with or without lamination.

In one embodiment, at least one secondary bag 20, 30, 40 is made of a shammy material such that when the system 1 is in a user's car and the user needs a towel or napkin, the user can use the shammy bag. After clean up, the user can wash the shammy bag in the washing machine.

In one embodiment, the bag 10, 20, 30, 40 may be made of different materials. For example, two sides and the bottom may be one material, while the two other sides are another material. Thus, two sides may be mesh to promote breathability or two sides may be clear to allow a user to view the contents of the bag 10, 20, 30, 40. Further, the bottom of the bag 10, 20, 30, 40 may be a different material to increase the strength of the bag.

In many embodiments, the materials of the bags are hypo-allergenic, non-toxic, and can withstand multiple uses such that the bags 10, 20, 30, 40 are reusable. In some embodiments, the primary bag 10 or all bags 10, 20, 30, 40 may be water repellant or have a coating/lining to repel moisture. This would allow a user to easily clean the bag 10, 20, 30, 40 by wiping it off with a towel or rag. In some embodiments, the lining may be slick, similar to Teflon or may be wax to repel moisture, dirt, germs, etc. Other embodiments may be hand-washable or machine-washable so users can clean the bag or bags. The bags may have either a glossy or a matte finish. In some embodiments, one or more bags 30 are insulated (e.g., have a lining or foil coating) and/or one or more bags 40 are mesh material.

In one embodiment, the primary bag 10 with compartments 14 to hold secondary bags 20, 30, 40 may be UV resistant, or include a UV-resistant coating on the exterior surface such that the primary bag 10 does not degrade due to excessive exposure to sunlight in the back of a user's car. The primary bag 10 with the UV-resistant coating or material would also protect the secondary bags 20, 30, 40 and would increase the lifetime of the system 1. Such a coating may be an elastomeric coating.

In one embodiment of the shopping bag storage system 1, the primary bag 10 and/or the secondary bags 20, 30, 40 have a lining or coating to prevent the buildup of germs, microrganisms, dirt, stains, grime, etc. In some embodiments, the bags may need to be composed of a material that is ultraviolet ("UV"), rot, microbial, and mold resistant. The bags may collect germs or other microorganisms from shopping carts, floors, trunks, stores, food, etc. Therefore, UV technology may be used to kill germs, mold, bacteria, etc. that may grow in or on the bags after use. In one embodiment, the primary bag 10 comprises a UV wand with a UV lamp, a power source (e.g., battery, plug, etc.), and connections to connect the UV lamp to the power source. The connections may include wires, hooks, screws, springs, chords, and other electrical or connection components. For example, a UV wand may be positioned along the top of a side of the primary bag 10. The user may turn the UV wand on when inserting secondary bags 20, 30, 40 into the primary bag 10 so that germs and microorganisms are killed and not further spread. The UV wand may only kill germs on surfaces that the UV light touches, therefore the user may turn the wand toward the outside of the primary bag 10 and wave an unrolled bag in front of the UV wand before rolling the secondary bag 20, 30, 40 and placing it in the primary bag 10.

In some embodiments, the bags 10, 20, 30, 40 may include particular surface textures (e.g., internally, externally, or both) that prevent undesired bacterial contamination of such surfaces. One embodiment will, therefore, include a surface generally known as Sharklet. Sharklet is the world's first technology to inhibit bacterial survival, growth, transfer and migration through pattern alone. The Sharklet surface is comprised of millions of tiny diamonds arranged in a distinct pattern that mimics the microbe-resistant properties of sharkskin. Sharklet is a simple, cost-effective solution for bacterial control.

In some embodiments, the bag may be composed of a self-healing material. One of the defining characteristics of living organisms is their inherent ability to repair physical damage. A growing trend in biomimicry is the creation of non-living structural materials that also have the capacity to heal themselves when cut, torn or cracked. Self-healing materials that can repair damage without external human intervention may give manufactured goods longer lifetimes and reduce the demand for raw materials, as well as improving the inherent safety of materials. Thus, a bag composed of a self-healing material can reduce tears, rips, spills, leakage, and contamination.

The bags 10, 20, 30, 40 may include designs, logos, screen printing, heat transfer prints, roller prints, offset prints, etc. The bags 10, 20, 30, 40 may come in various colors, designs, and sizes. In one embodiment, the main bag 10 may be one color or have one design while the secondary bags 20, 30, 40 may be another color or have other designs that are different from the main bag 10. Accordingly, all secondary bags 20, 30, 40 may look the same while the primary bag 10 may look different in order to distinguish the bags. In a further embodiment, the primary bag 10 may be one color or have a design/logo while the secondary bags 20, 30, 40 are color coded for the type of product it holds, for example, green for produce, blue for cold/frozen items, red for meat, yellow for poultry, etc. Color coding reduces the risk of cross contamination from meat, fish, produce, and the like. Additionally, the colors remind consumers of the type of product for which the bag is designed. For example, one secondary bag 20 may be light blue for carrying sea food; one secondary bag 40 may be green (and may even be mesh) for carrying produce; one secondary bag 20 may be yellow for carrying chicken or other meat; one secondary bag 30 may be purple or dark blue (and may be insulated) for carrying frozen or refrigerated items; one secondary bag 20 may be white for carrying bread and other baked goods; one secondary bag 20 may be brown for carrying alcohol or other bottles and beverages; and so on.

In one embodiment, the bags 10, 20, 30, 40 have colored trim. In some embodiments, the colored trim is the piping 60 shown in FIG. 2. The trim may be a different color or material than the rest of the bag 10, 20, 30, 40 and may be for style purposes and/or for additional support. The trim may have ribbons, mesh material, glitter, and the like for style purposes.

In some embodiments, the bags 10, 20, 30, 40 may have UPC tags, barcodes, SKUs, etc. The bags 10, 20, 30, 40 may also have hang tabs or other ways to identify the bags 10, 20, 30, 40.

In various embodiments, the bags 10, 20, 30, 40 may have grommets, snaps, zippers, etc. The primary bag 10 and/or the secondary bags 20, 30, 40 may have Velcro closures, zippers 366, tabs with snaps 64, 66, 68, 266, 268, snaps or buttons 302, 304, ribbons, or string 404 to close the bag 10, 20, 30, 40 and keep it closed. The closing mechanism 366, 404, 402, 266, 268, 66, 68 may be positioned at the top or open end of the bag 10, 20, 30, 40. The closing mechanisms are useful to prevent purchased items from falling out of the bag and they help to keep the secondary bags 20, 30, 40 constrained within the primary bag 10 when the system 1 is stored in a user's car, truck, bike, or other moving space. Furthermore, the closing mechanisms 366, 404, 402, 266, 268, 66, 68 may keep the secondary bags 20, 30, 40 rolled up tightly to allow the secondary bags 20, 30, 40 to be inserted into the main bag 10 with ease.

The primary bag 10, and the secondary bags 20, 30, 40 in some embodiments, may have snaps or clips to keep the bag in an open position in order to insert the rolled up secondary bags 20, 30, 40. The clips, snaps, or Velcro may be on tabs that secure one side of the bag to another side of the bag. Multiple (one or more) tabs with securing mechanisms may be positioned on the primary bag 10 to counteract the pull of the other tabs to keep the bag 10 open. These securing mechanisms may also secure the main bag 10 to a shopping cart 90 and/or secure the main bag 10 to a mounting device in a user's car. Thus, in one embodiment, the system 1 may include a mounting device that the user can put in his/her car in order to detachably interconnect the main bag 10 with the secondary bags 20, 30, 40 to the mounting device to keep the system 1 from moving around the user's car or trunk.

In some embodiments, the reusable shopping bag storage system 1 also reminds a user to remove the system 1 from the user's car or other vehicle before entering a store. Thus, the primary bag 10 may include a chip or other processor that communicates with the user's electronic device, for example, smart phone, tablet, smart watch, or vehicle infotainment system (e.g., car's audio an navigation system), etc. to remind the user to take the reusable shopping bag storage system into the store. The chip or processor in the reusable shopping bag storage system 1 either knows or determine the position or location of the reusable shopping bag storage system 1 or the chip or processor works in conjunction with an electronic device to determine the location of the reusable shopping bag storage system 1 relative to a store (e.g., grocery store). Thus, when the chip or processor and/or electronic device determine that the reusable shopping bag storage system 1 is proximate to a store (such as a grocery store or other shopping store), the electronic device notifies the user reminding the user to take the reusable shopping bag storage system 1 into the store. In one embodiment, different preferred stores and distances from the stores can be set in the chip or processor and/or the user's electronic device such that the user is only notified when he or she is within a set distance from a preferred store. The chip or processor and electronic device may also know if the reusable shopping bag storage system 1 is stationary indicating that the user has parked his or her car and will be entering a store.

Further, the system 1 may also include an application (i.e., app) for an electronic device (for example, smart phone, tablet, smart watch, or vehicle infotainment system) that communicates with the chip or processor. Accordingly, the application can remind the user to take the reusable shopping bag storage system 1 into the store with the user. Further, the electronic device, phone, tablet, smart watch, or vehicle infotainment system comprises a processor, memory, an input device, a display to display content, electrical circuits, and a power source (which can be a battery). The electronic device and/or the reusable shopping bag storage system 1 can further include data storage, software, a user interface, an input device, an output device, a communication network, such as Bluetooth or WiFi, and/or a communication interface for communicating with the chip or processor on the system 1, another computing device, and/or the communication network. In further embodiments, the processor can include any processor capable of performing instructions encoded in software or firmware. Further, the processor can be provided to execute instructions contained within the memory and/or data storage. The processor can comprise a controller or application specific integrated circuit (ASIC) having or capable of performing instructions encoded in logic circuits. The memory may be used to store programs or data, including data comprising content. As examples, the memory may comprise RAM, SDRAM, or other solid state memory. Alternatively or in addition, data storage may be provided. The data storage may generally include storage for programs and data.

Additionally, in some embodiments, the reusable shopping bag storage system 1 can receive relevant data (e.g., position or location of the system 1) from the user's electronic device using near field communication (NFC) or other wireless proximity sensors between the system 1 and electronic device.

In one embodiment, the position of the reusable shopping bag storage system 1 can be recorded using a computing device, such as a computer, tablet, smart phone, or other electronic device, and digital memory for subsequent use of the data in further operations. The electronic device can further include data storage, software, a user interface, an input device, an output device, a communication network, such as Bluetooth or WiFi, and/or a communication interface for communicating with another computing device and/or the communication network. In another embodiment, the reusable shopping bag storage system's 1 position is recorded using a device or mechanism that comprises a processor, memory, an input device, a display to display content, and a power source (which can be a battery). Alternatively, other positioning devices and/or computing devices known in the art can be used.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

What is claimed is:

1. A reusable bag comprising:
   a front panel having an outer surface, an inner surface, a first side edge, a second side edge, a bottom edge, a top edge, a stiffening hem positioned along the top edge, and piping positioned only along the first side edge, the second side edge, and the bottom edge, the front panel being comprised of a non-woven material;
   a back panel positioned opposite the front panel and having an outer surface, an inner surface, a first side edge, a second side edge, a bottom edge, a top edge, a stiffening hem positioned along the top edge, and piping positioned only along the first side edge, the second side edge, and the bottom edge, the back panel being comprised of a non-woven material;

a first side panel having an outer surface, an inner surface, a first side edge, a second side edge, a bottom edge, a top edge, and a stiffening hem positioned along the top edge, the first side panel being comprised of a non-woven material, wherein the first side edge of the first side panel is interconnected to the second side edge of the back panel and the second side edge of the first side panel is interconnected to the first side edge of the front panel;

a second side panel having an outer surface, an inner surface, a first side edge, a second side edge, a bottom edge, a top edge, and a stiffening hem positioned along the top edge, the second side panel being comprised of a non-woven material, wherein the first side edge of the second side panel is interconnected to the second side edge of the front panel and the second side edge of the second side panel is interconnected to the first side edge of the back panel;

a bottom panel having an outer surface, an inner surface, a first edge interconnected to the bottom edge of the front panel, a second edge interconnected to the bottom edge of the first side panel, a third edge interconnected to the bottom edge of the back panel, and a fourth edge interconnected to the bottom edge of the second side panel, the bottom panel being comprised of a non-woven material;

a cavity formed by the bottom panel, front panel, back panel, first side panel, and second side panel, the cavity having an open end proximate the top edges of the front panel, back panel, first side panel, and second side panel;

a first channel wall having a first edge interconnected to the inner surface of the first side panel, a second edge interconnected to the inner surface of the second side panel, a top edge substantially perpendicular to the first and second edges of the first channel wall and positioned proximate the open end of the cavity, and a bottom edge positioned opposite the top edge of the first channel wall and positioned a distance above the bottom panel, wherein the first channel wall is substantially perpendicular to the first side panel;

a second channel wall having a first edge interconnected to the inner surface of the first side panel, a second edge interconnected to the inner surface of the second side panel, a top edge substantially perpendicular to the first and second edges of the second channel wall and positioned proximate the open end of the cavity, and a bottom edge positioned opposite the top edge of the second channel wall and positioned a distance above the bottom panel, wherein the second channel wall is substantially parallel to the first channel wall, and wherein the first channel wall and the second channel wall form a channel in the cavity, wherein the channel in the cavity has a width between the first channel wall and the second channel wall, and wherein the channel in the cavity has a length that is parallel to the first and second channel walls and that is parallel to the front and back panels;

a first divider having a first edge interconnected to the inner surface of the front panel and a second edge interconnected to the first channel wall, wherein the first divider, a portion of the first channel wall, a portion of the first side panel, and a portion of the front panel form a first compartment in the cavity, wherein the first compartment has a length, and wherein the first compartment has a width that is substantially the same as the length of the first compartment;

a second divider having a first edge interconnected to the inner surface of the back panel and a second edge interconnected to the second channel wall, wherein the second divider, a portion of the second channel wall, a portion of the first side panel, and a portion of the back panel form a second compartment in the cavity, wherein the second compartment has a length and a width, wherein the length of the second compartment is substantially the same as the length of the first compartment and the width of the second compartment is substantially the same as the width of the first compartment, and wherein the width of the channel is about one-third of the width of the first compartment;

a first handle having a first end interconnected to a first portion of the front panel proximate the top edge of the front panel and a second end interconnected to a second portion of the front panel proximate the top edge of the front panel, wherein the first handle generally extends in a direction substantially parallel to the first and second channel walls; and a second handle having a first end interconnected to a first portion of the back panel proximate the top edge of the back panel and a second end interconnected to a second portion of the back panel proximate the top edge of the back panel, wherein the second handle generally extends in a direction substantially parallel to the first and second channel walls.

2. The reusable bag of claim 1, further comprising an interconnection device on at least one of the first handle and the second handle.

3. The reusable bag of claim 2, wherein the interconnection device comprises a strap with male snap element that selectively engages a female snap element.

4. The reusable bag of claim 1, wherein the front panel, the back panel, the first side panel, and the second side panel are comprised of non-woven laminate material between about 95 gsm and about 175 gsm.

5. The reusable bag of claim 1, further comprising an ultraviolet wand interconnected to at least one of the front panel and the back panel.

6. The reusable bag of claim 1, further comprising:
at least one external pocket; and
wherein the piping is a woven nylon material.

7. The reusable bag of claim 1, further comprising an interconnection device comprising:
a strap having a proximal end with a loop portion encircling the first handle and a distal end opposite the proximal end;
a first snap element interconnected to the loop portion of the strap; and
a second snap element interconnected to the distal end of the strap.

8. The reusable bag of claim 7, wherein the fastener of the first strap is one of a hook material, a loop material, a female snap, and a male snap, and wherein the second strap is one of a hook material, a loop material, a female snap, and a male snap.

9. A reusable shopping bag system comprising:
a primary bag having:
a front panel having an outer surface, an inner surface, a first side edge, a second side edge, a bottom edge, and a top edge, the front panel being comprised of a non-woven material;

a back panel positioned opposite the front panel and having an outer surface, an inner surface, a first side edge, a second side edge, a bottom edge, and a top edge, the back panel being comprised of a non-woven material;

a first side panel having an outer surface, an inner surface, a first side edge, a second side edge, a bottom edge, and a top edge, the first side panel being comprised of a non-woven material, wherein the first side edge of the first side panel is interconnected to the second side edge of the back panel and the second side edge of the first side panel is interconnected to the first side edge of the front panel;

a second side panel having an outer surface, an inner surface, a first side edge, a second side edge, a bottom edge, and a top edge, the second side panel being comprised of a non-woven material, wherein the first side edge of the second side panel is interconnected to the second side edge of the front panel and the second side edge of the second side panel is interconnected to the first side edge of the back panel;

a bottom panel having an outer surface, an inner surface, a first edge interconnected to the bottom edge of the front panel, a second edge interconnected to the bottom edge of the first side panel, a third edge interconnected to the bottom edge of the back panel, and a fourth edge interconnected to the bottom edge of the second side panel, the bottom panel being comprised of a non-woven material;

a cavity formed by the bottom panel, front panel, back panel, first side panel, and second side panel, the cavity having an open end proximate the top edges of the front panel, back panel, first side panel, and second side panel;

a first channel wall having a first edge interconnected to an inner surface of the first side panel and a second edge interconnected to an inner surface of the second side panel, wherein the first channel wall is substantially perpendicular to the first side panel;

a second channel wall having a first edge interconnected to the inner surface of the first side panel and a second edge interconnected to the inner surface of the second side panel, wherein the second channel wall is substantially parallel to the first channel wall, and wherein the first channel wall and the second channel wall form a channel in the cavity;

a plurality of dividers forming a plurality of storage compartments, wherein each divider in the plurality of dividers has a first side edge interconnected to the inner surface of at least one of the front panel and the back panel and a second side edge interconnected to at least one of the first channel wall and the second channel wall, wherein each divider is positioned a first height below the top edges of the front panel, back panel, first side panel, and second side panel and positioned a second height above the bottom panel, and wherein the second height is at least three times the first height;

a first handle having a first end interconnected to a first portion of the front panel proximate the top edge and a second end interconnected to a second portion of the front panel proximate the top edge;

a second handle having a first end interconnected to a first portion of the back panel proximate the top edge and a second end interconnected to a second portion of the back panel proximate the top edge; and a pocket positioned on the outer surface of the front panel and extending from the first side edge to the second side edge of the front panel and extending from the bottom edge to a distance below the top edge of the front panel, wherein a top edge of the pocket does not have piping or a stiffening hem; and a plurality of secondary bags comprising:
  a plurality of reusable shopping bags, wherein each reusable shopping bag includes a front, a back opposite the front, a first side and a second side positioned between the front and the back, and a bottom forming a compartment with an open end and a closed end proximate the bottom; a first carrying handle interconnected to the front proximate the open end; and a second carrying handle interconnected to the back proximate the open end, wherein each reusable shopping bag in the plurality of reusable shopping bags is stored in a rolled configuration in different storage compartments in the plurality of storage compartments of the primary bag;
  an insulated reusable bag including:
    a front, a back opposite the front, a first side and a second side positioned between the front and back, and a bottom forming a compartment with an open end and a closed end proximate the bottom;
    an insulating material positioned on an inner surface of the front and an inner surface of the back;
    a first flap extending from a first edge between the bottom and the first side, the first flap comprising a first snap;
    a second flap extending from a second edge between the bottom and the second side, the second flap comprising a second snap, wherein the first snap engages the second snap to secure the insulated reusable bag in a folded configuration;
    a first carrying handle interconnected on a first end to an outer surface of the front at the closed end and extending upwardly from the closed end to the open end and along the outer surface of the front and interconnected on a second end to the outer surface of the front at the closed end and extending upwardly from the closed end to the open end and along the outer surface of the front, the first carrying handle having a center portion between the first end and the second end that extends upwardly beyond the open end; and
    a second carrying handle interconnected on a first end to an outer surface of the back at the closed end and extending upwardly from the closed end to the open end and along the outer surface of the back and interconnected on a second end to the outer surface of the back at the closed end and extending upwardly from the closed end to the open end and along the outer surface of the back, the second carrying handle having a center portion between the first end and the second end that extends upwardly beyond the open end,
    wherein the insulated reusable bag is stored in the channel of the primary bag in the folded configuration; and
  a reusable mesh bag comprising an open end, a closed end, and a closure mechanism proximate the open end for closing the open end, and wherein the reusable mesh bag is stored in the pocket of the primary bag.

10. The reusable shopping bag system of claim 9, wherein the primary bag further comprises:
- a first divider in the plurality of dividers having a first edge interconnected to the inner surface of the front panel and a second edge interconnected to the first channel wall, wherein the first divider in the plurality of dividers, a portion of the first channel wall, a portion of the first side panel, and a portion of the front panel form a first compartment in the plurality of compartments; and
- a second divider in the plurality of dividers having a first edge interconnected to the inner surface of the back panel and a second edge interconnected to the second channel wall, wherein the second divider in the plurality of dividers, a portion of the second channel wall, a portion of the first side panel, and a portion of the back panel form a second compartment in the plurality of compartments.

11. The shopping bag system of claim 9, wherein a first reusable shopping bag in the plurality of reusable shopping bags comprises a closure mechanism comprising:
- a first strap having a proximal end interconnected to the front proximate to the open end and a distal end opposite the proximal end, wherein the distal end includes a fastener; and
- a second strap having a proximal end interconnected to the back proximate to the open end and a distal end opposite the proximal end, wherein the distal end includes a fastener adapted to mateably receive the fastener of the first strap.

12. The shopping bag system of claim 9, wherein the front panel, the back panel, the first side panel, and the second side panel of the primary bag are comprised of non-woven laminate material between about 95 gsm and about 175 gsm, wherein the front, the back, the first side, and the second side of each reusable shopping bag in the plurality of reusable shopping bags are comprised of non-woven laminate material between about 95 gsm and about 145 gsm, wherein the front, the back, the first side, and the second side of the insulated reusable bag are comprised of non-woven polypropylene material between about 60 gsm and about 105 gsm, and wherein the insulating material is spunlace foil insulation.

13. The reusable shopping bag system of claim 9, wherein the primary bag further comprises an interconnection device on at least one of the first handle and the second handle, wherein the interconnection device detachably secures the reusable shopping bag system to at least one of a shopping cart, an interior of a vehicle, and a trunk.

14. A reusable shopping bag system comprising:
- a primary bag having:
  - a front panel having an outer surface, an inner surface, a first side edge, a second side edge, a bottom edge, and a top edge, the front panel being comprised of a non-woven material;
  - a back panel positioned opposite the front panel and having an outer surface, an inner surface, a first side edge, a second side edge, a bottom edge, and a top edge, the back panel being comprised of a non-woven material;
  - a first side panel having an outer surface, an inner surface, a first side edge, a second side edge, a bottom edge, and a top edge, the first side panel being comprised of a non-woven material, wherein the first side edge of the first side panel is interconnected to the second side edge of the back panel and the second side edge of the first side panel is interconnected to the first side edge of the front panel;
  - a second side panel having an outer surface, an inner surface, a first side edge, a second side edge, a bottom edge, and a top edge, the second side panel being comprised of a non-woven material, wherein the first side edge of the second side panel is interconnected to the second side edge of the front panel and the second side edge of the second side panel is interconnected to the first side edge of the back panel;
  - a bottom panel having an outer surface, an inner surface, a first edge interconnected to the bottom edge of the front panel, a second edge interconnected to the bottom edge of the first side panel, a third edge interconnected to the bottom edge of the back panel, and a fourth edge interconnected to the bottom edge of the second side panel, the bottom panel being comprised of a non-woven material;
  - a cavity formed by the bottom panel, front panel, back panel, first side panel, and second side panel, the cavity having an open end proximate the top edges of the front panel, back panel, first side panel, and second side panel;
  - a first channel wall having a first edge interconnected to an inner surface of the first side panel and a second edge interconnected to an inner surface of the second side panel, wherein the first channel wall is substantially parallel to the front panel, wherein a top edge of the first channel wall is positioned a first distance below the top edge of the first side panel and a bottom edge of the first channel wall is positioned a second distance above the bottom panel;
  - a second channel wall having a first edge interconnected to the inner surface of the first side panel and a second edge interconnected to the inner surface of the second side panel, wherein the second channel wall is substantially parallel to the first channel wall, wherein a top edge of the second channel wall is positioned a first distance below the top edge of the first side panel and a bottom edge of the second channel wall is positioned a second distance above the bottom panel, and wherein the first channel wall and the second channel wall form a channel in the cavity;
  - a plurality of dividers forming a plurality of storage compartments, wherein each divider in the plurality of dividers has a first side edge interconnected to the inner surface of at least one of the front panel and the back panel and a second side edge interconnected to at least one of the first channel wall and the second channel wall; and
  - a pocket positioned substantially flush against the outer surface of the front panel; and
- a plurality of secondary bags comprising:
  - a plurality of reusable shopping bags, wherein each reusable shopping bag includes a front, a back opposite the front, a first side and a second side positioned between the front and the back, and a bottom forming a compartment with an open end and a closed end proximate the bottom; a first carrying handle interconnected to the front proximate the open end; and a second carrying handle interconnected to the back proximate the open end, wherein each reusable shopping bag in the plurality of reusable shopping bags is stored in a rolled configuration in its own storage compartment in the plurality of storage compartments of the primary bag;

an insulated reusable bag including:
- a front, a back opposite the front, a first side and a second side positioned between the front and back, and a bottom forming a compartment with an open end and a closed end proximate the bottom;
- an insulating material positioned on an inner surface of the front and an inner surface of the back;
- a first flap extending from a first edge between the bottom and the first side, the first flap comprising a first snap;
- a second flap extending from a second edge between the bottom and the second side, the second flap comprising a second snap, wherein the first snap engages the second snap to secure the insulated reusable bag in a folded configuration;
- a zipper with a first side positioned along a top edge of the front and a second side positioned along a top edge of the back, the first side of the zipper interconnecting to the second side of the zipper to close the open end of the compartment;
- a first carrying handle interconnected on a first end to an outer surface of the front at the closed end and extending upwardly from the closed end to the open end and along the outer surface of the front and parallel to a side edge of the front and interconnected on a second end to the outer surface of the front at the closed end and extending upwardly from the closed end to the open end and along the outer surface of the front and parallel to the side edge of the front, the first carrying handle having a center portion between the first end and the second end that extends upwardly beyond the open end; and
- a second carrying handle interconnected on a first end to an outer surface of the back at the closed end and extending upwardly from the closed end to the open end and along the outer surface of the back and parallel to a side edge of the back and interconnected on a second end to the outer surface of the back at the closed end and extending upwardly from the closed end to the open end and along the outer surface of the back and parallel to the side edge of the back, the second carrying handle having a center portion between the first end and the second end that extends upwardly beyond the open end, wherein the insulated reusable bag is stored in the channel of the primary bag in the folded configuration; and a reusable mesh bag comprising an open end, a closed end, and a closure mechanism proximate the open end for closing the open end, and wherein the reusable mesh bag is stored in the pocket.

\* \* \* \* \*